United States Patent
Dobric et al.

(10) Patent No.: US 7,290,051 B2
(45) Date of Patent: Oct. 30, 2007

(54) METHOD AND APPARATUS FOR HARDWARE IMPLEMENTATION INDEPENDENT VERIFICATION OF NETWORK LAYERS

(75) Inventors: Damian Dobric, Lowell, MA (US);
Eduard Rozman, Waltham, MA (US);
Francis Wong, Boston, MA (US);
Arina Finkelstein, Lexington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1057 days.

(21) Appl. No.: 10/338,987

(22) Filed: Jan. 9, 2003

(65) Prior Publication Data

US 2004/0136325 A1   Jul. 15, 2004

(51) Int. Cl.
*G06F 15/173* (2006.01)
*G06F 11/00* (2006.01)

(52) U.S. Cl. .................................. 709/224; 714/43
(58) Field of Classification Search ................ 709/224; 714/43
See application file for complete search history.

(56) References Cited

U.S. PATENT DOCUMENTS

| | | | |
|---|---|---|---|
| 6,381,642 B1* | 4/2002 | O'Donnell et al. | 709/224 |
| 7,107,359 B1* | 9/2006 | Burton et al. | 709/250 |
| 2001/0054093 A1* | 12/2001 | Iwatani | 709/223 |
| 2002/0143942 A1* | 10/2002 | Li et al. | 709/225 |
| 2002/0169815 A1 | 11/2002 | Wong et al. | |
| 2002/0170004 A1 | 11/2002 | Parrett et al. | |
| 2004/0078709 A1* | 4/2004 | Beukema et al. | 714/43 |

OTHER PUBLICATIONS

Introduction to InfiniBand, pp. 1-20, Dec. 7, 2001, Mellanox Technology.*
Test Tools for Infiniband, pp. 1-16, Aug. 28, 2002, Agilent Technology.*
Dawson et al. Probing and Fault Injection of Dependable Distributed Protocol, pp. 286-300, 1995.*
EP, Search Report, Jun. 2, 2006.

* cited by examiner

*Primary Examiner*—Larry D. Donaghue
(74) *Attorney, Agent, or Firm*—Dorsey & Whitney LLP

(57) ABSTRACT

A verification mechanism monitors incoming and outgoing traffic between a channel adapter and a switch fabric in an InfiniBand[SM] system in order to verify that the InfiniBand[SM] protocol is correctly followed by the channel adapter. The verification mechanism uses a simple hardware-independent interface to query the channel adapter hardware for specific values and completion queue, queue pair and work queue element attributes that are required for verification. The verification mechanism creates a plurality of verification components that monitor incoming and outgoing messages and verify that each of the channel adapter elements correctly follows the protocol. The verification mechanism is controlled by a verification application programming interface (API) that allows different test benches and tests to incorporate InfiniBand[SM] protocol verification in any test system for use with any hardware.

30 Claims, 21 Drawing Sheets

METHOD AND APPARATUS FOR HARDWARE IMPLEMENTATION INDEPENDENT VERIFICATION OF NETWORK LAYERS

FIELD OF THE INVENTION

This invention relates to verification and testing of hardware implementations of network channel adapters, and, in particular, to the verification and testing of the network transport and link layers of such hardware implementations.

BACKGROUND OF THE INVENTION

In conventional computer systems, various components, such as CPUs, memory and peripheral devices, are interconnected by a common signal transfer path called a "bus". Busses are implemented in a variety of well-known standard architectures including Fibre Channel architecture and, more recently, InfiniBand$^{SM}$ architecture. These architectures are not memory-mapped architectures. Instead, the CPU and memory are connected to host channel adapters. The input/output (I/O) devices are connected to target channel adapters. The host and target channel adapters communicate by messages comprising one or more data packets transmitted over serial point-to-point links established via a hardware switch fabric to which the host and target channel adapters are connected. The messages are enqueued for delivery between the channel adapters. This type of architecture will be referred to as a message-passing queue-oriented architecture in the following description.

The components connected to the channel adapters can control data transfer by creating structures called work queues. Work queues are always created in pairs, called queue pairs, and contain one work queue for send operations and one work queue for receive operations. Each client has one or more queue pairs and each queue pair is independent from other queue pairs. In general, the send work queue of a queue pair holds instructions that cause data to be transferred between a client's memory and another process's memory, and the receive work queue of a queue pair holds instructions that instruct the client where to place data that is received from another process. Another queue called a completion queue receives acknowledgements from the recipient of a message indicating the status of the requested operation. In order to use the work queue pair, a client submits a work request to its respective channel adapter and the work request causes an instruction called a "work queue element" to be placed on the appropriate send work queue.

Channel adapters developed by different companies and for different products are implemented differently. For example, different channel adapters may have a different internal structure for completion queues, queue pair state, or work queue elements. Even though the internal implementation may differ, in order to work with an InfiniBand$^{SM}$ system, all channel adapters must follow strictly an InfiniBand$^{SM}$ protocol that is defined in detail in an InfiniBand$^{SM}$ Specification Rev 1.0a, The InfiniBand$^{SM}$ Trade Association (2001).

One part of this specification relates to the manner in which a channel adapter connects to an InfiniBand$^{SM}$ switch fabric. Typically, the channel adapters connect to the switch fabric by means of a network protocol stack. In order to reduce design complexity, most networks are organized as a series of hardware and software levels or "layers" within each node. These layers interact to format data for transfer between nodes that are communicating over the network. Specifically, predetermined services are performed on the data as it passes through each layer and the layers communicate with each other by means of the predefined protocols. This layered design permits each layer to offer selected services to other layers using a standardized interface that shields those layers from the details of actual implementation of the services.

In an attempt to standardize network architectures, i.e., the sets of layers and protocols used within a network, a generalized model has been proposed by the International Standards Organization (ISO). The model, called the open systems interconnection (OSI) reference model, addresses the interconnection of systems that are "open" for communication with other systems. The proposed OSI model has seven layers which are termed, in ascending interfacing order, the "physical", "data link", "network", "transport", "session", "presentation" and "application" layers. These layers are arranged to form a protocol "stack" in each node of the network.

In order to verify that a channel adapter is operating properly and complies with the aforementioned InfiniBand$^{SM}$ protocol, it is necessary to verify that the network layers are operating properly, and, in particular, that the network transport and link layers are operating properly. However, since these layers are implemented in the internal hardware of each channel adapter, it is necessary to test the hardware to determine whether it is implementing the InfiniBand$^{SM}$ protocol properly in these layers. Thus, special test circuits must be designed for each hardware implementation.

SUMMARY OF THE INVENTION

In accordance with the principles of the invention, the InfiniBand$^{SM}$ protocol verification is separated from hardware implementation details by a hardware-independent verification mechanism that can be used in any functional design verification simulation environment, regardless of the specific hardware channel adapter implementation.

In one embodiment, the verification mechanism monitors incoming and outgoing traffic between a channel adapter and the InfiniBand$^{SM}$ switch fabric. Since this traffic conforms to the InfiniBand$^{SM}$ protocol, it is only necessary to determine the attributes of completion queues, queue pairs and work queue elements that are defined by the aforementioned InfiniBand$^{SM}$ specification and are hardware independent. Similarly, the verification mechanism uses a simple hardware-independent interface to query the channel adapter for hardware-specific values and hardware-specific completion queue, queue pair and work queue element attributes that are required for verification.

In another embodiment, the verification mechanism can be controlled by a verification application programming interface (API) that allows different test benches and tests to incorporate InfiniBand$^{SM}$ protocol verification in any test system for use with any hardware. This API can be used in any environment without knowledge of all the details of how the verification mechanism is implemented.

BRIEF DESCRIPTION OF THE DRAWINGS

The above and further advantages of the invention may be better understood by referring to the following description in conjunction with the accompanying drawings in which.

DETAILED DESCRIPTION

Figure 1:
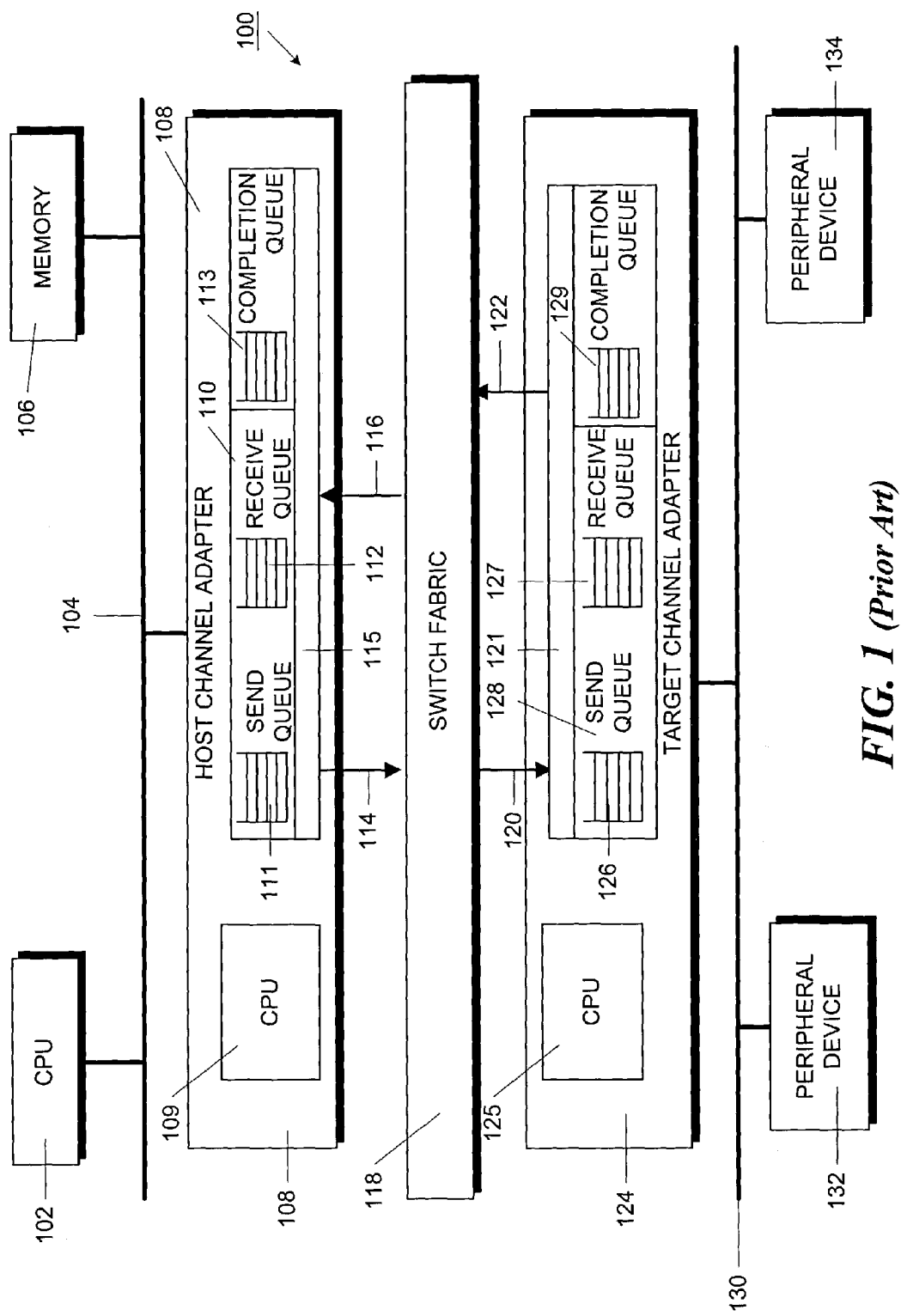
FIG. 1 is a block schematic diagram of a conventional InfiniBand$^{SM}$ system illustrating the channel adapters and the switch fabric.

FIG. 1 illustrates, in block schematic form, a message passing queue-oriented bus architecture with an attached peripheral bus. In this figure and the discussion that follows, the InfiniBand$^{SM}$ architecture is used as an illustration of such a system. However, it will be apparent to those skilled in the art that the principles of the invention are applicable to other similar systems that use the same message passing queue-oriented architecture. The InfiniBand$^{SM}$ system 100 shown in FIG. 1 has a memory interconnect bus 104 that connects CPU 102 and memory 106. The memory interconnect bus 104 is, in turn, connected to a host channel adapter (HCA) 108 that includes its own CPU 109 and memory 111. Other HCAs (not shown) may also exist in a conventional InfiniBand$^{SM}$ system, but have been omitted for clarity.

The HCA 108 is connected to a switch fabric 118 for both sending and receiving data as indicated schematically by arrows 114 and 116. The HCA 108 can be connected to any number of peripheral busses via the switch fabric 118. In particular, the HCA 108 can be connected to various peripherals, of which two, 132 and 134 are shown, via a peripheral bus 130, by means of a target channel adapter (TCA) 124. TCA 124 can both send and receive data as indicated schematically by arrows 120 and 122. The TCA 124 also includes a CPU 125 and a memory 127. Other TCAs (not shown) may also be present.

Clients of both the HCA 108 and the TCA 124 can control data transfer by creating facilities called work queues. Work queues are always created in pairs, called queue pairs, and contain one work queue for send operations and one work queue for receive operations. Each client has one or more queue pairs and each queue pair is independent from other queue pairs. In general, the send work queue of a queue pair holds instructions that cause data to be transferred between a client's memory and another process's memory, and the receive work queue of a queue pair holds instructions that instruct the client where to place data that is received from another process. For example, HCA 108 has a queue pair consisting of send queue 110 and receive queue 112. Similarly, TCA 124 has a queue pair consisting of send queue 126 and receive queue 128. Although only two queue pairs are shown, typically each client would create many more queue pairs in order to conduct its operation. In order to use the queue pair, a client submits a work request to its respective channel adapter and the work request causes an instruction called a Work Queue Element (WQE) to be placed on the appropriate send or receive work queue.

There are several classes of send queue operations, including SEND operations and RDMA operations. For a SEND operation, the WQE specifies a block of data in the client's memory space for the hardware to send to the destination. At the destination, a corresponding already-queued receive WQE in a receive queue specifies where to place that data. For an RDMA operation, the WQE specifies a block of data to be sent and specifies the address at the destination where the data is to be placed.

RDMA operations include RDMA WRITE and RDMA READ. The RDMA WRITE operation stipulates that the hardware is to transfer data from the client's memory to the remote process's memory. The RDMA READ operation stipulates that the hardware is to transfer data from the remote process memory to the client's memory.

Both the host and target channel adapter hardware comprise a transport engine that executes WQEs in the order that they were placed on the send work queue. For example, host channel adapter 108 includes transport engine 115 and target channel adapter 124 includes transport engine 121. In the process of sending data, the transport engine in the source channel adapter interprets the WQE in its send queue and creates a request message, which includes the data, to send to the destination channel adapter. The transport engine segments the message into multiple packets if necessary, adds the appropriate routing headers, and sends the packet out.

When the destination receives a packet, its transport engine associates the received packet with a particular work queue pair and uses the context of that work queue pair to process the packet and execute the operation. If necessary, the destination transport engine creates an acknowledgment message and sends that message back to the source channel adapter.

When a queue pair is created, it is associated with one of five transport service types that indicate the degree of reliability, the destination and the manner in which the queue pair transfers data. These transport types are reliable connection (RC), unreliable connection (UC), reliable datagram (RD), unreliable datagram (UD) and raw datagram. Reliable transport services use a combination of sequence numbers and acknowledgment messages (ACK/NAK) to verify packet order delivery, prevent duplicate packets and out-of-sequence packets from being processed, and to detect missing packets (for example, packets lost due to a fabric reconfiguration or packets discarded due to check code violations). Thus, reliable transport services can guarantee that messages are delivered at most once, in order and without corruption (in the absence of errors.) Unreliable transport services cannot guarantee delivery of messages. Thus, the sender receives no acknowledgement of message receipt, there are no packet order guarantees and messages may be dropped upon corruption or dropped and out of order packets. The sender considers the operation complete when the last or only packet has been committed to the fabric and the responder considers the operation complete when it has received an opcode indicating the last or only packet has been received and all validity checks have been completed.

An InfiniBand$^{SM}$ operation is defined to include a request message and, for reliable services, the corresponding response. Thus, the request message is generated by a requester, and a response, if one exists, is generated by the responder. A request message consists of one or more packets. The packets of a request message are called request packets. A response, except for an RDMA READ response, consists of exactly one packet. A response is also called an "acknowledge." The response packet acknowledges receipt of one or more packets. The response may acknowledge the receipt of packets that comprise anywhere from a portion of a request message to multiple request messages.

Unreliable transport services do not use acknowledgment messages. They do however generate sequence numbers. This allows a responder to detect out-of-sequence or missing packets and to perform local recovery processing. Both the HCA 108 and the TCA 124 also include a completion queue (133 and 129, respectively.)

The structure and operation of the InfiniBand$^{SM}$ system are described in detail in the InfiniBand Specification Rev 1.0a, *The InfiniBand$^{SM}$ Trade Association* (2001) which specification is incorporated by reference herein in its entirety.

Figure 2:
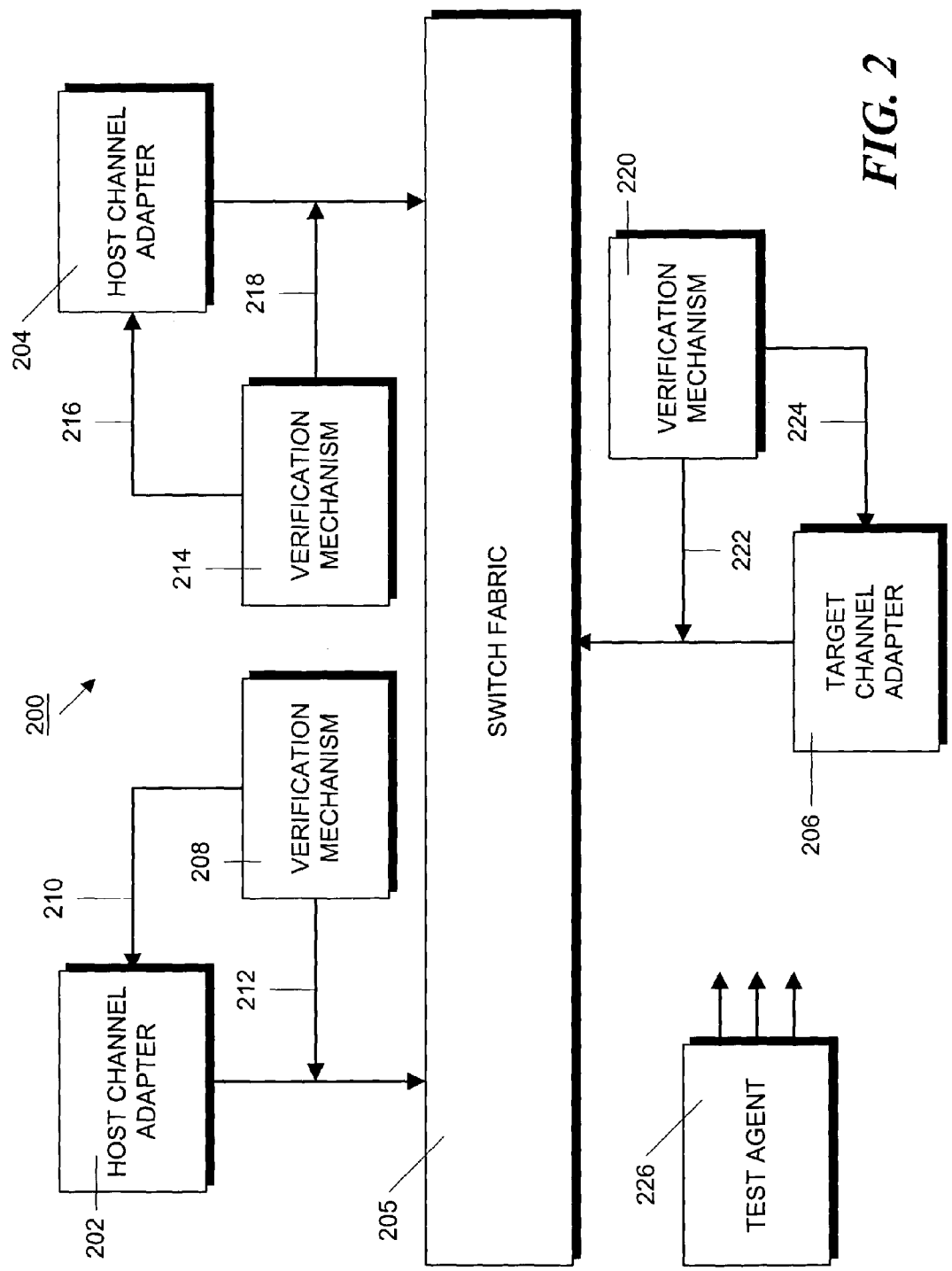
FIG. 2 is a block schematic diagram illustrating how the verification mechanism is connected to each channel adapter to allow verification of the transport and data link layers for that channel adapter.

FIG. 2 illustrates an Infiniband$^{SM}$ system 200 in which verification mechanisms 208, 214 and 220 constructed in accordance with the principles of the present invention has been installed. Each of verification mechanisms 208, 214 and 220 resides between a host channel adapter or target channel adapter and the InfiniBand$^{SM}$ switch fabric 205. In order for a verification mechanism to verify the incoming or outgoing traffic of a channel adapter, only the attributes of completion queues, queue pairs, and work queue elements as defined by the InfiniBand$^{SM}$ Specification are required. Each verification mechanism monitors the incoming and outgoing messages on the connection between the channel adapters 202, 204 and 206 and switch fabric 205. This monitoring is indicated schematically by arrows 212, 218 and 222, respectively. Each verification mechanism also requires a simple interface to query the channel adapter for hardware-specific values and hardware-specific completion queue, queue pair, and work queue element attributes that are required for verification. For example, the interfaces for verification mechanisms 208, 214 and 220 are illustrated schematically by arrows 210, 216 and 224, respectively. However, the verification mechanism is an entirely passive mechanism, since it only verifies InfiniBand$^{SM}$ protocol activity but does not initiate any activity in the hardware and is completely independent of the hardware implementation.

Each verification mechanism 208, 214 and 220 provides the following verification for the transport layer of the InfiniBand$^{SM}$ Protocol:

(a) It verifies functionality of all service types defined by the InfiniBand$^{SM}$ Architecture, including reliable connection (RC), unreliable connection (UC), reliable datagram (RD), unreliable datagram (UD), and raw datagram service types. Verification of each service type includes verification of each operation type, including send, RDMA read, RDMA write, and atomic operation types.

(b) It verifies that all posted send and receive work requests result in transmission of the correct corresponding message according to queue pair and work queue element attributes and it also verifies each packet in each message.

(c) It verifies completion of send and receive work requests.

(d) It verifies channel adapter behavior during different switch fabric anomalies such as dropped packets, out-of-order packets, duplicate packets, and corrupt packets.

(e) It verifies that a channel adapter "silently drops" packets that are identified as invalid in the transport layer.

Each verification mechanism 208, 214 and 220 further provides the following verification for the data link layer of the InfiniBand$^{SM}$ Protocol:

(a) It verifies Cyclic Redundancy Codes (CRCs) in packets, including Invariant CRC (ICRC) generation/checking.

(b) It verifies flow control for virtual lanes.

(c) It verifies packet-ordering rules.

(d) It verifies that a channel adapter "silently drops" packets that are identified as invalid in the data link layer.

The verification mechanisms 208, 214 and 220 are configured and controlled by a test agent illustrated schematically at 226. The test agent is not part of the verification system, but it can communicate with each verification mechanism, as described below. In turn, the test agent may be part of, or operate under control of, a test bench (not shown in FIG. 2). Alternatively, the test agent can be a sequencer driven by a plurality of tests designed by a test technician.

Figure 3:
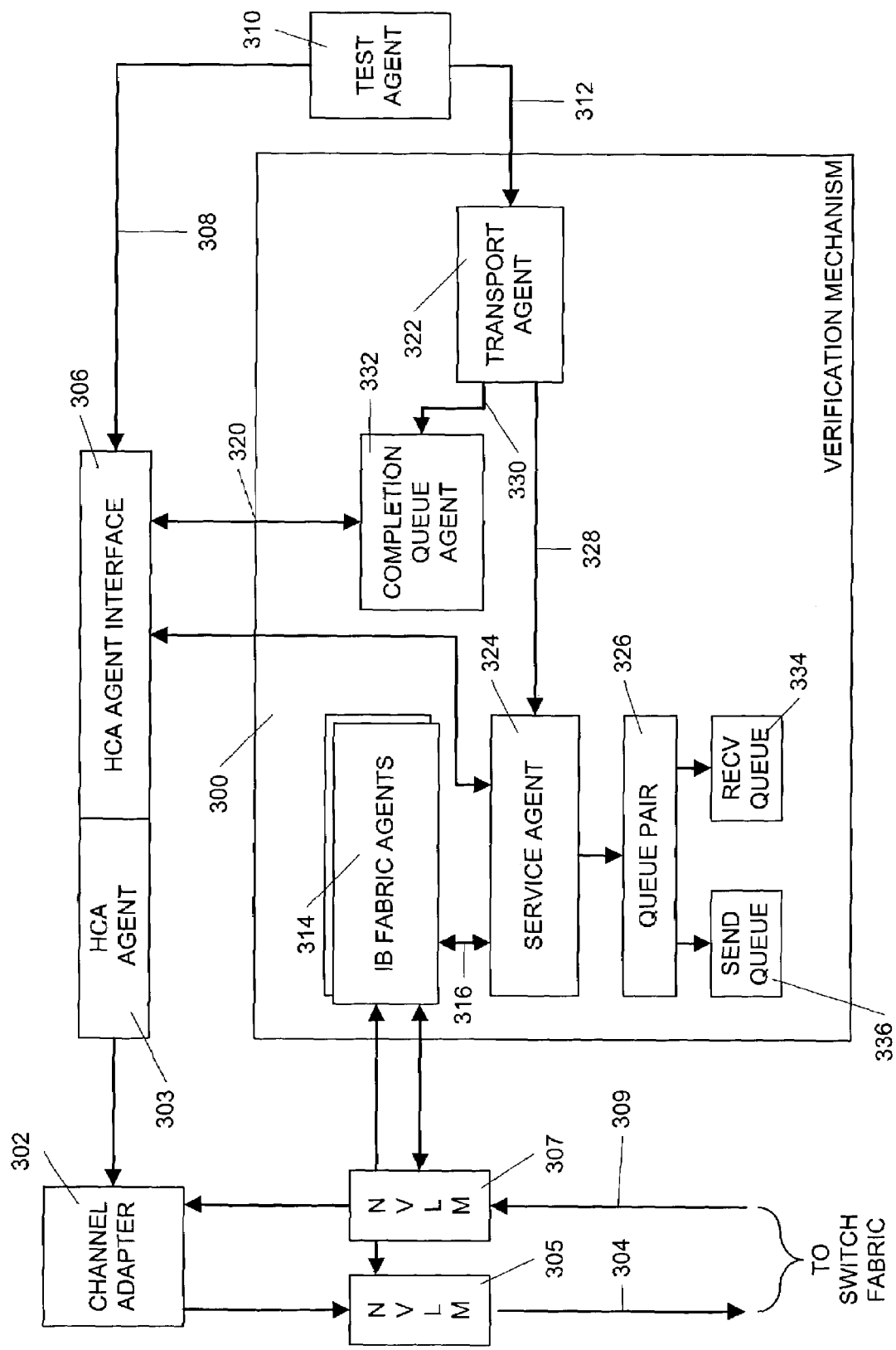
FIG. 3 is a more detailed block schematic diagram of the internal architecture of a verification mechanism constructed in accordance with the principles of the invention.

The internal architecture of each verification mechanism 300 consists of seven main components, as shown in FIG. 3. The transport agent component 322 provides an application programming interface (API) to the entire verification mechanism so that it can be easily used in any test environment. The transport agent component 322 creates one or more copies of the service agent component 324 (as indicated by arrow 328), and the completion queue agent component 332 (as indicated by arrow 330). The service agent component, in turn, creates the queue pair component 326, and the send and receive queue components, 336 and 334. Although only one copy of each component is shown in the figure, there may be multiple copies depending on the hardware architecture and the verification operations performed.

Each completion queue agent component, such as component 332, provides verification of completion of send and receive work requests on an associated channel adapter. Each service agent component, such as 324, provides verification of a service type and is associated with a completion queue agent component 332 for completion of its work requests. In addition, each service agent component 326 contains a queue pair component 326 that represents a queue pair corresponding to the service type being verified by the service agent component. The queue pair component 326 includes a receive queue component 334 and a send queue component 336. Although not shown in FIG. 3 for clarity, the completion queue agent 332 can create multiple copies of completion queue element components, each of which represents one completion queue element. Similarly, the send queue agent component can create multiple copies of send work queue element components and the receive queue agent component can create multiple copies of receive work queue element components that are also not shown in FIG. 3. Each work queue element component represents a single work queue element.

The system also defines an HCA agent interface 306 that is used by both the completion queue agent 332 (as indicated by arrow 320) and service agent component 324 (as indicated by arrow 318) to query the channel adapter hardware 302 for specific values and completion queue, queue pair and work queue element attributes. The HCA agent interface 306 controls an HCA agent 303. Since the HCA agent 303 must work closely with the channel adapter hardware 302, its implementation is hardware dependent, although the interface 306 is hardware independent.

The IB fabric agents 314 simulate the InfiniBand$^{SM}$ switch fabric layer. One fabric agent is used for incoming messages 309 and another fabric agent is used for outgoing messages 304. Fabric agents 314 control network verification layer mechanisms (NVLMs) 305 and 307 to store data packets that are sent to, and received from, the switch fabric. The NVLMs allow the fabric agent to create errors, such as duplicate or dropped data packets, for testing purposes. An NVLM suitable for use with the fabric agents 314 is described in detail in co-pending U.S. patent application Ser. No. 09/852,482, entitled METHOD AND APPARATUS FOR CONFIGURATION INDEPENDENT SIMULATION OF NETWORK LAYER CONDITIONS, filed on May 10, 2001 by Francis Wong, Eduard Rozman and George Plouffe, which application is hereby incorporated in its entirety.

Both the transport agent 322 and the channel adapter agent 303 (via the interface 306) can be controlled by a test agent 310 that specifies the tests to be run. This test agent 310 is not part of the verification system. For example, it might be part of a test bench or a sequencer. In either case, the test agent 310 runs a set of tests that verify the operation of the transport and data link layers. In order to perform each test in the test set, the test agent 310 determines which queue pairs should be set up, the messages that are sent and the other details of performing specific tests. The test agent 310 then generates instructions that are used to create queue pairs, to generate and receive messages and to specify events to be monitored.

However, the test agent 310 is not hardware-specific. Thus, in order to cause the channel adapter 302 to perform an operation, such as creating a queue pair, the test agent instructs the hardware-specific HCA agent 303 to perform the operation by passing hardware-independent information to the HCA agent, via the HCA agent interface 306 as schematically illustrated by arrow 308. Once instructed, the hardware-specific HCA Agent 303 is designed to control a specific channel adapter hardware 302 to perform the operation. Thus, it contains all the hardware-specific information necessary to operate with a specific piece of hardware. For example, it operates with the bus protocol that is required to interface with the hardware and it issues the proper commands to cause the hardware to perform a specific operation. It also writes to the correct CSRs and uses the correct doorbell mechanism, etc. In order to cause the hardware to perform the requested operations, the HCA agent 303 actually drives the required bits on the wires that connect it to the channel adapter hardware 302. Thus, the HCA Agent 303 is the entity that performs the creation and initialization of queue pairs and completion queues and posts send and receive work queue elements in the channel adapter 302.

In general, the HCA agent 303 does not perform any verification except during a few circumstances involving completions where the completion queue agent 332 of the verification mechanism 300 cannot verify the exact timing of interrupts since these are hardware-dependent. Consequently, the completion queue agent 332, via the interface 306, requests that the HCA agent 303 verify these interrupt timings as schematically indicated by the arrow 320.

Verification of the channel adapter operation is performed by the verification mechanism 300. In particular, the instructions generated by the test agent 310 that are used by the HCA agent 303 to control the channel adapter 302 are also applied to the transport agent 322 as schematically illustrated by arrow 312. In response to these instructions, the transport agent 322 controls the completion queue agent 332 as indicated by arrow 330 and the service agent 324 as indicated by arrow 328 to create the appropriate components that verify that the operations of the channel adapter 302 that have been requested by the HCA agent 303 are performed correctly.

In one embodiment, the verification mechanism 300 is implemented with an object-oriented software program and each of the verification mechanism components is implemented by an object. FIGS. 4-16 illustrate some of the classes used to instantiate objects that implement the verification mechanism components and the major methods used in these classes. In order to clarify the description, internal data structures and conventional constructor, "get" and "set" methods have been omitted from these figures. However, these additional structures and methods would be well known to those skilled in the art. In addition, although an object-oriented implementation has been illustrated, those skilled in the art would realize that alternative implementations are possible, including non object-oriented programs, hardware and combinations of the two implementations.

Figure 4:
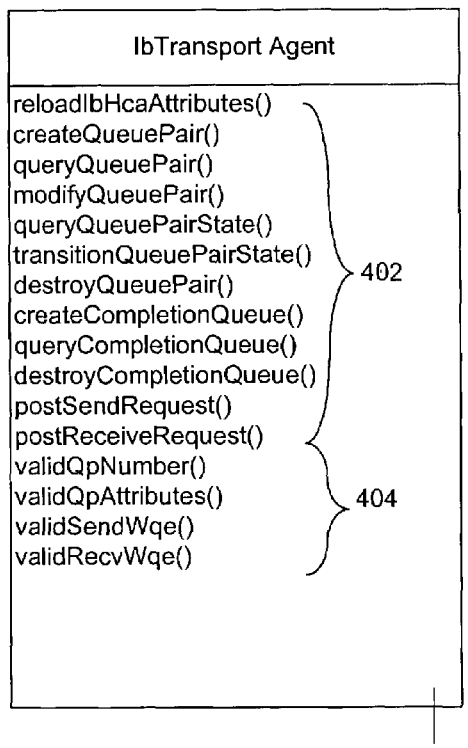
FIG. 4 is a class diagram of the transport agent class, including the API exported by the class.

FIG. 4 illustrates a class (IbTransportAgent) for instantiating a transport agent object that implements the transport agent component of the verification mechanism. This class contains a plurality of public methods 402 and a plurality of private methods 404. The public methods 402 comprise an application programming interface (API) which can be used by an external entity to control the verification mechanism 300. For example, the aforementioned test agent 310 can use the API methods 402 to control the verification system 300. In general, the methods create a software model of the activity that has been requested by the test agent, via the HCA agent, in the hardware. This software model is then used to verify the actual hardware activity. The purpose of each method is generally indicated by its name and the arguments have been omitted for clarity. For example, the reloadIbHcaAttributes( ) method receives a data structure containing hardware-specific HCA attributes and stores the attributes in an internal data structure in the transport agent object.

Similarly, the createQueuePair( ) method causes the service agent component 324 to create and initialize a queue pair object (described below) and its appropriate send and receive queue objects (also described below) for verifying the creation and operation of a queue pair in the channel adapter hardware. The queue pair object and related queue objects can be manipulated via other methods in the transport agent object. For example, the transitionQueuePairState( ) method informs the queue pair object that a state transition of a specified queue pair number has been requested and is expected. Similar methods are provided to verify the modification of the attributes of a queue pair (modifyQueuePair( )) and retrieve the attributes of a queue pair (queryQueuePair( )). A further method is used first to verify the destruction of a queue pair (destroyQueuePair( )) and then to destroy the related queue pair and queue objects in the verification mechanism.

Additional methods are provided to instruct the completion queue agent component 332 to create and destroy completion queue objects (createCompletionQueue( ) and destroyCompletionQueue( ), respectively) that verify the creation and destruction of completion queues in the channel adapter hardware. Further methods cause the service agent component 324 to verify that send requests have been posted (postSendRequest( )) and receive requests have been posted (postReceiveRequest( )) in the channel adapter. Private methods 404 of the transport agent object validate queue pair numbers, queue pair attributes, send work queue elements and receive work queue elements (validQpNumber( ), validQpAttributes( ), validSendWqe( ) and validRecvWqe( ), respectively).

Figure 5:
FIG. 5 is a class diagram of the channel adapter agent class.

FIG. 5 illustrates a channel adapter agent class. It has methods for creating, querying, modifying and destroying queue pairs (createQueuePair( ), queryQueuePairState( ), modifyQueuePair( ) and destroyQueuePair( ) in the channel adapter hardware. Similarly, methods are provided for creating, querying, resizing and destroying completion queues in the channel adapter hardware (createCompletionQueue( ), queryCompletionQueue( ), resizeCompletionQueue( ) and destroyCompletionQueue( ), respectively). An additional method (setCompletionEventHandler( )) sets up an event handler to be called when a completion occurs. In general these methods parallel methods with the same name in the IbTransportAgent object shown in FIG. 4. Thus, an external system, such as a test agent would call methods with the same name in both objects to perform and verify an operation. For example, calling the createQueuePair( ) methods in the HcaAgent object and the IbTransportAgent object would cause the HcaAgent object to create a queue pair in the channel adapter and the IbTransportAgent object to create verification objects that verify the correct creation of the queue pair.

The registerWorkCompletionEvent( ) method is called by a completion agent component to register an event to be triggered when a completion is generated by the channel adapter for that particular completion queue. The getCompletions( ) method can also be called by a completion agent component when the aforementioned event is triggered in order to obtain a linked list of completions.

An additional method, expectSolicitedEvent( ), informs the channel adapter agent object that events requested by the verification system are to be expected by the channel adapter. Therefore, if these events are not received, an error will be detected. Additional methods allow a queue pair state transition requested by the transport agent object to be verified (verifyQueuePairStateTransition( )) and a work completion event to be registered (registerWorkCompletionEvent( )). Methods are also provided for validating memory access (validMemoryAccess( )), obtaining memory data (getMemoryData( )) and getting the number of data segments in each send request (getNumDataSegmentsSendRequests( )). An initiateTesting( ) method informs the channel adapter agent object that testing is to begin.

Figure 6:
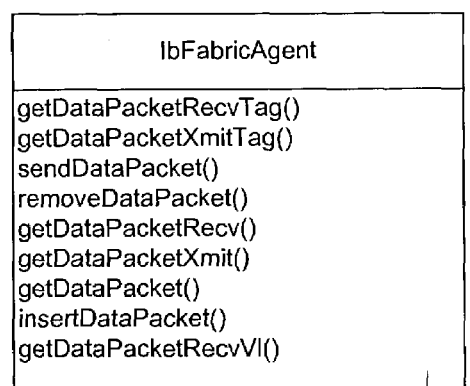
FIG. 6 is a class diagram of the fabric agent class.

FIG. 6 illustrates methods in a fabric agent object class that are implemented by a fabric agent object instantiated from the class. These methods allow the verification mechanism to obtain information in data packets transmitted between the channel adapter and the switch fabric by means of the getDataPacketRecv( ) and getDataPacketXmit( ) methods along with the getDataPacketRecvTag( ) and getDataPacketXmitTag( ) methods. Errors can be simulated using the removeDataPacket( ) and insertDataPacket( ) methods to simulate dropped and duplicated packets. The sendDataPacket( ) method is used to request the fabric agent to send a packet. The getDataPacketRecvVI( ) method returns information from the last received packet.

Figure 7:
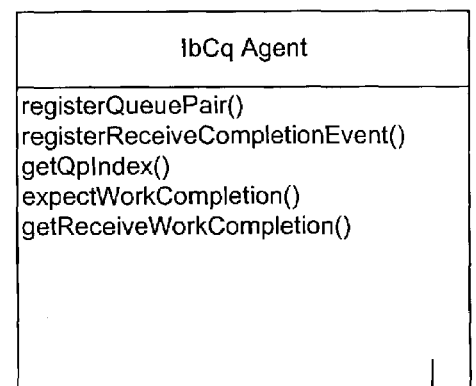
FIG. 7 is a class diagram of the completion queue agent class.

FIG. 7 illustrates the methods in the completion queue agent class. The registerQueuePair( ) method is an initialization method that is called by an IbServiceAgent object to associate its queue pair with a completion queue managed by the completion queue agent object. The registerReceiveCompletionEvent( ) method is also an initialization method that is called by an IbServiceAgent object to pass an event to be triggered upon receive work queue element completions for its queue pair. In order for an IbServiceAgent object to verify that a completion occurs correctly for an operation, the IbServiceAgent object calls the expectWorkCompletion( ) method to queue an expected completion in the completion queue agent that the completion queue agent must verify. The getReceiveWorkCompletion( ) method is used by the IbServiceAgent object to retrieve the last receive work queue element completion when the IbServiceAgent object is notified by the event previously registered with the aforementioned registerReceiveCompletionEvent( ) method.

Figure 8:
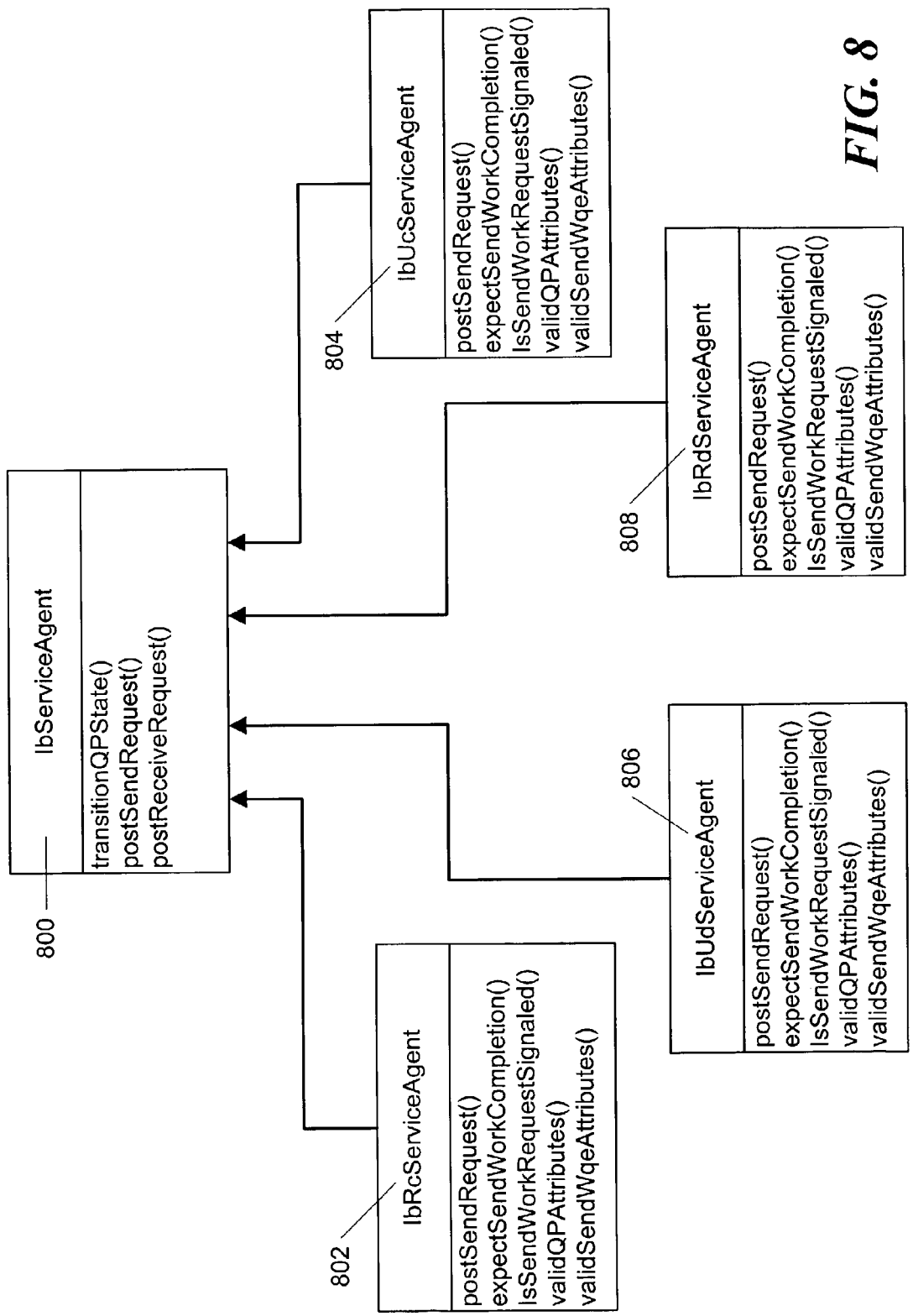
FIG. 8 is a class diagram of the service agent class and its subclasses.

FIG. 8 illustrates classes and subclasses used to instantiate a service agent object. A service agent object encapsulates all verification of a particular service communication between two or more (in the case of reliable and unreliable datagrams) queue pairs. Many of the methods of the service agent object are dependent on the type of service that is being verified. Accordingly, a separate subclass is provided to instantiate an object specific to each service type. The base service agent class 800 includes a transitionQPState( ), a postSendRequest( ) and a postReceiveRequest( ) method. The postSendRequest( ) method is an abstract method that is implemented by the corresponding methods in the subclasses. The RC service agent subclass 802 is used to instantiate an object that verifies the reliable connection service type. The UD service agent class 806 is used to instantiate an object that verifies the unreliable datagram service type. Similarly, the RD service agent class 808 is used to instantiate an RD service agent object that verifies the reliable datagram service type. Finally, the UC service agent class 804 is used to instantiate an object that verifies the unreliable connection service type.

Each of the service agent subclasses has various methods that post send requests (postSendRequest( ) implementing the abstract postSendRequest( ) method of the base class), validate queue pair attributes (validQpAttributes( )) and validate send work queue element attributes (validSendWqeAttributes( )). Methods are also provided for verifying that send requests have been completed (expectSendWorkCompletion( )) and verifying that send work requests have been signaled (isSendWorkRequestSignaled( )). Although each of objects 802-808 has methods with the same names, the implementation of these methods depends on the particular service that the object is designed to verify.

Figure 9:
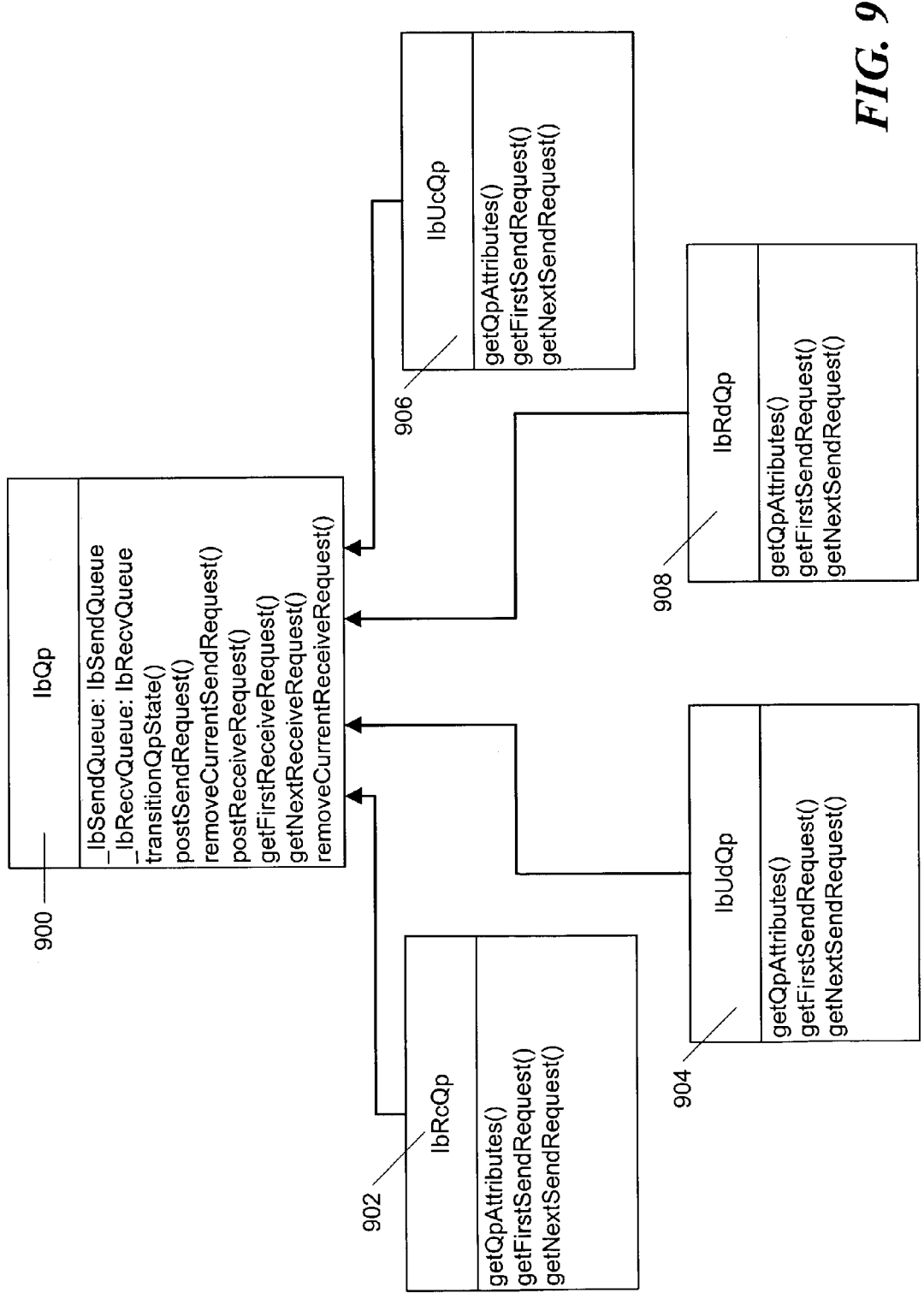
FIG. 9 is a class diagram of the queue pair class and its subclasses.

Classes and subclasses that implement objects for verifying queue pairs are shown in FIG. 9. The queue pair base class, IbQp 900, contains internal data array structures (IbSendQueue and IbReceiveQueue) that store the send and receive queue objects that have been instantiated. The IbQp class also includes methods which allow the verification mechanism to post and remove send requests (send work queue entries), (postSendRequest( ) and removeCurrentSendRequest( )), transition the queue pair state (transitionQpState( )), post receive requests (receive work queue entries) (postReceiveRequest( )) and obtain receive requests from the queue pair (getFirstReceiveRequest( ) and getNextReceiveRequest( )). As with the service agent classes, the queue pair classes are subclassed depending on the type of service that the verification mechanism is intended to verify. Each of subclasses 902-906 has three methods which are used to obtain the queue pair attributes and to obtain send requests (getQpAttributes( ), getFirstSendRequest( ) and getNextSendRequest( )). Although the method names are the same in each of the four subclasses, the implementation of these methods would be dependent on the actual service type that the subclass is intended to verify.

Figure 10:
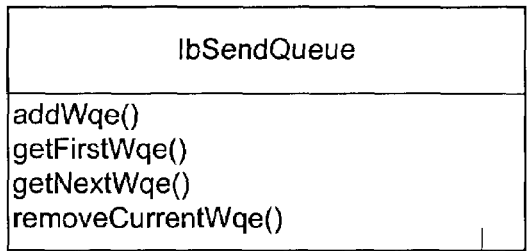
FIG. 10 is a class diagram of a send queue class.
Figure 11:
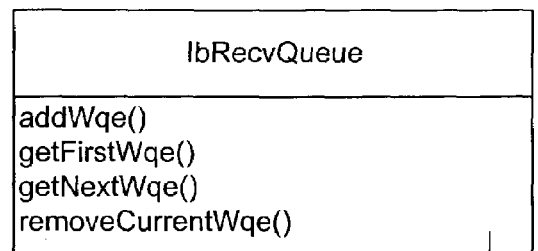
FIG. 11 is a class diagram of a receive queue class.

FIGS. 10 and 11 illustrate classes 1000 and 1100 for instantiating objects that represent a send queue (IbSendQueue 1000) and a receive queue (IbRecvQueue 1100) in the verification system. The send queue and receive queue objects maintain lists of work queue element objects that represent the work queue elements on the actual send and receive queues in the channel adapter hardware. Each class has methods for manipulating the work queue element objects on the internal list. These methods include methods for adding work queue element objects (addWqe( )), methods for iterating through the work queue entries of the list (getFirstWqe( ) and getNextWqe( )) and methods for removing work queue element objects from the list (removeCurrentWqe( )).

Figure 12:
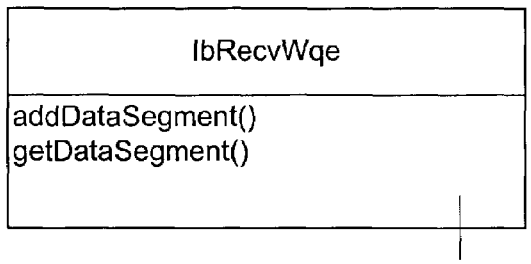
FIG. 12 is a class diagram of a receive work queue element class.

FIG. 12 illustrates a receive work queue element class 1200 that can be used to instantiate an object that represents a work queue element on a receive work queue in the channel adapter. Each work queue element object defines a hardware-independent format for representing a work queue element. The receive work queue element object maintains a list of data segments by number and length and contains two methods for manipulating this list. These methods include the addDataSegment( ) method that adds a data segment with a specified number and length to the list and the getDataSegment( ) method that retrieves a data segment with a specified number and length from the list.

Figure 13:
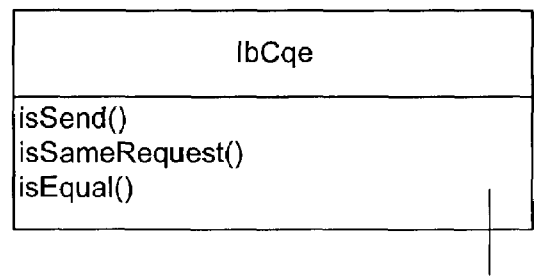
FIG. 13 is a class diagram of a completion queue element class.

FIG. 13 illustrates a completion queue element class 1300 that can be used to instantiate an object that represents a completion queue element on a completion queue in the channel adapter. Each completion queue element object defines a hardware-independent format for representing a completion queue element. The completion queue element object maintains information concerning a completion queue element that it represents. This information includes the operation type, the operation status, the work request ID, the data present, the queue pair number, the service level and various information identifying the source and destination. The class also includes several methods for identifying request types, including the isSend( ), isSameRequest( ) and isEqual( ) methods.

Figure 14:
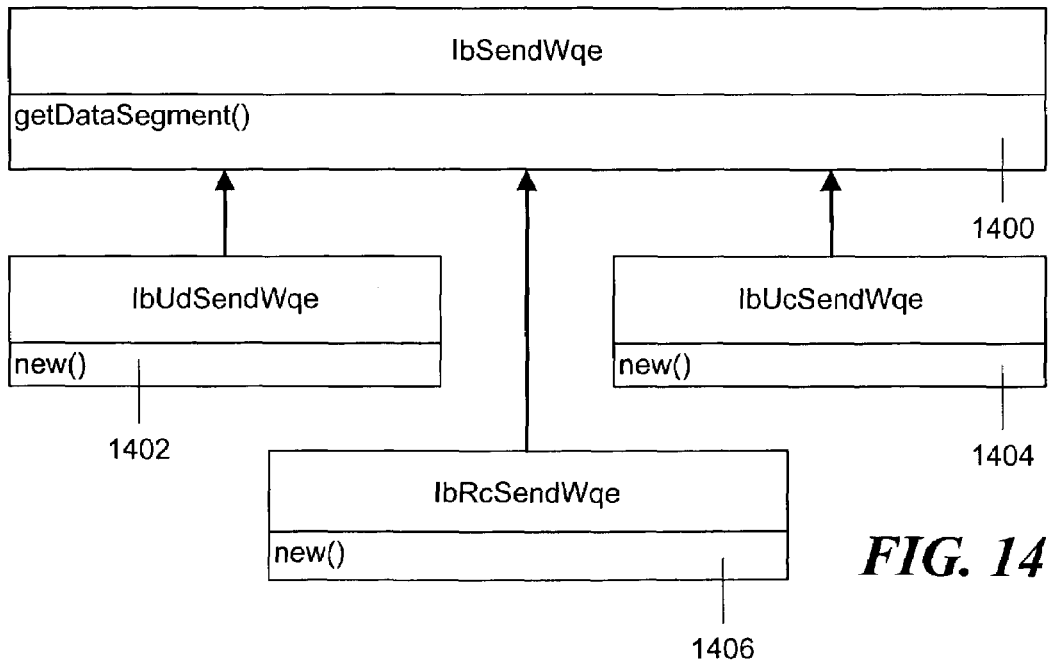
FIG. 14 is a class diagram of a send work queue element and its subclasses.

FIG. 14 illustrates a class and subclass diagram for work queue element classes that can be used to instantiate an object that represents a work queue element on a send queue in the channel adapter. Each send work queue element object defines a hardware-independent format for representing a send work queue element. The base class 1400 maintains a list of data segments by number and length and contains two methods for manipulating this list. These methods include the addDataSegment( ) method that adds a data segment with a specified number and length to the list and the getDataSegment( ) method that retrieves a data segment with a specified number and length from the list. As the information which is maintained by the send work queue element objects is dependent on the service type, separate subclasses 1402-1406 are provided to represent send work queue entries associated with reliable and unreliable connections and unreliable datagrams.

Figure 15:
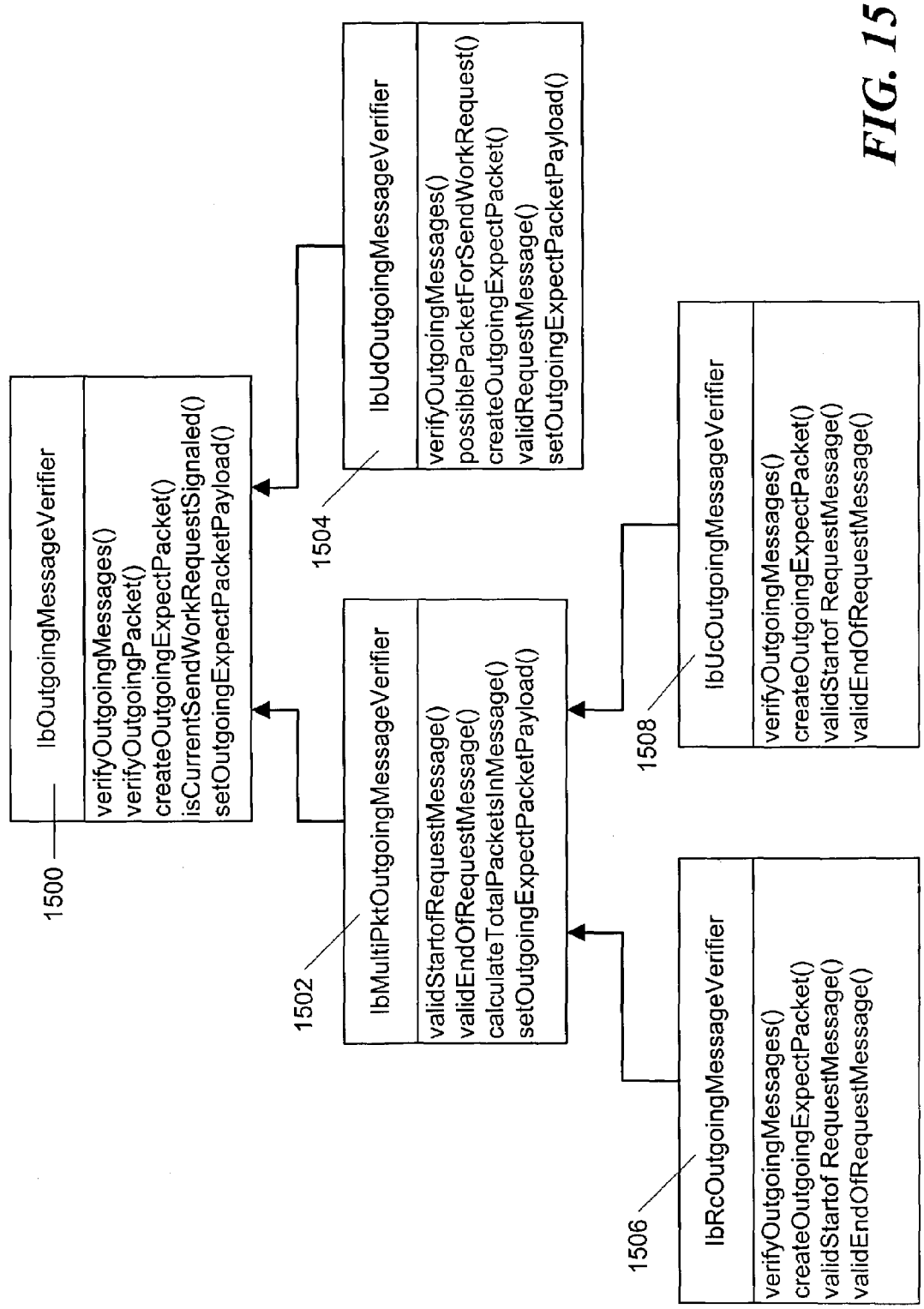
FIG. 15 is a class diagram of the outgoing message verifier class and its subclasses.

FIG. 15 indicates a subclass arrangement for an outgoing message verifier class 1500. Objects instantiated from this set of classes are used to verify messages generated by a channel adapter. The outgoing message verifier class 1500 contains several abstract methods that are implemented in the subclasses. The methods include a private method that allows an object instantiated from it to verify all outgoing messages (verifyOutgoingMessages( )). This method is called only once and spawns a separate thread that verifies all outgoing messages by monitoring the activity. Another method is provided to verify the packets contained within such messages (verifyOutgoingPacket( )). Another method (createOutgoingExpectPacket( )) creates an outgoing packet expected to be received at a destination and a further method sets the expected outgoing packet payload (setOutgoingExpectPacketPayload( )). Another method determines whether the current work request has been signaled (isCurrentSendWorkRequestSignaled( )).

Class 1500 has a multi-packet outgoing message verifier subclass 1502. This latter subclass is used for the reliable connection and the unreliable connection service types that can contain multiple packets. Subclass 1502 contains several abstract methods that are intended for validating the start message and the end message of a request (validStartOfRequestMessage( ) and validEndOfRequestMessage( )). Class 1502 also contains a method for calculating the total packets in a message (calculateTotalPacketsInMessage( ) and a method that allows the corresponding object to set the expected outgoing packet payload (setOutgoingExpectPacketPayload( )).

The multi-packet outgoing message verifier class 1502 has two subclasses, containing methods whose implementation is dependent on the type of service designed to be verified by the corresponding objects. The RC outgoing message verifier class 1506 generates an object that verifies the reliable connection service type. Alternatively, the UC outgoing message verifier type 1508 generates an object that verifies the unreliable connection service type. These subclasses contain methods that allow objects created from them to verify all outgoing messages (verifyOutgoingMessages( )), create the packets expected to be in outgoing messages for verifying them (createOutgoingExpectPacket( )) and to validate the start and the end messages of the request (validStartOfRequestMessage( ) and validEndOfRequestMessage( )). Note that these latter methods implement the abstract methods of the same name in the parent class 1502.

The outgoing message verifier class 1500 also has an additional subclass 1504 for creating an object that verifies unreliable datagram outgoing messages. This subclass contains methods that allow an object created from it to verify all outgoing messages (verifyOutgoingMessages( )), create expected outgoing packets (createOutgoingExpectPacket( )), validate request messages (validRequestMessage( )) and set an expected outgoing packet payload (set- OutgoingExpectPacketPayload( )). A further method (possiblePacketForSendWorkRequest( )) is provided for determining whether a packet is a possible packet resulting from a send work request, since packets are not necessarily transmitted in order in an unreliable datagram service type due to different virtual channel usage.

Figure 16:
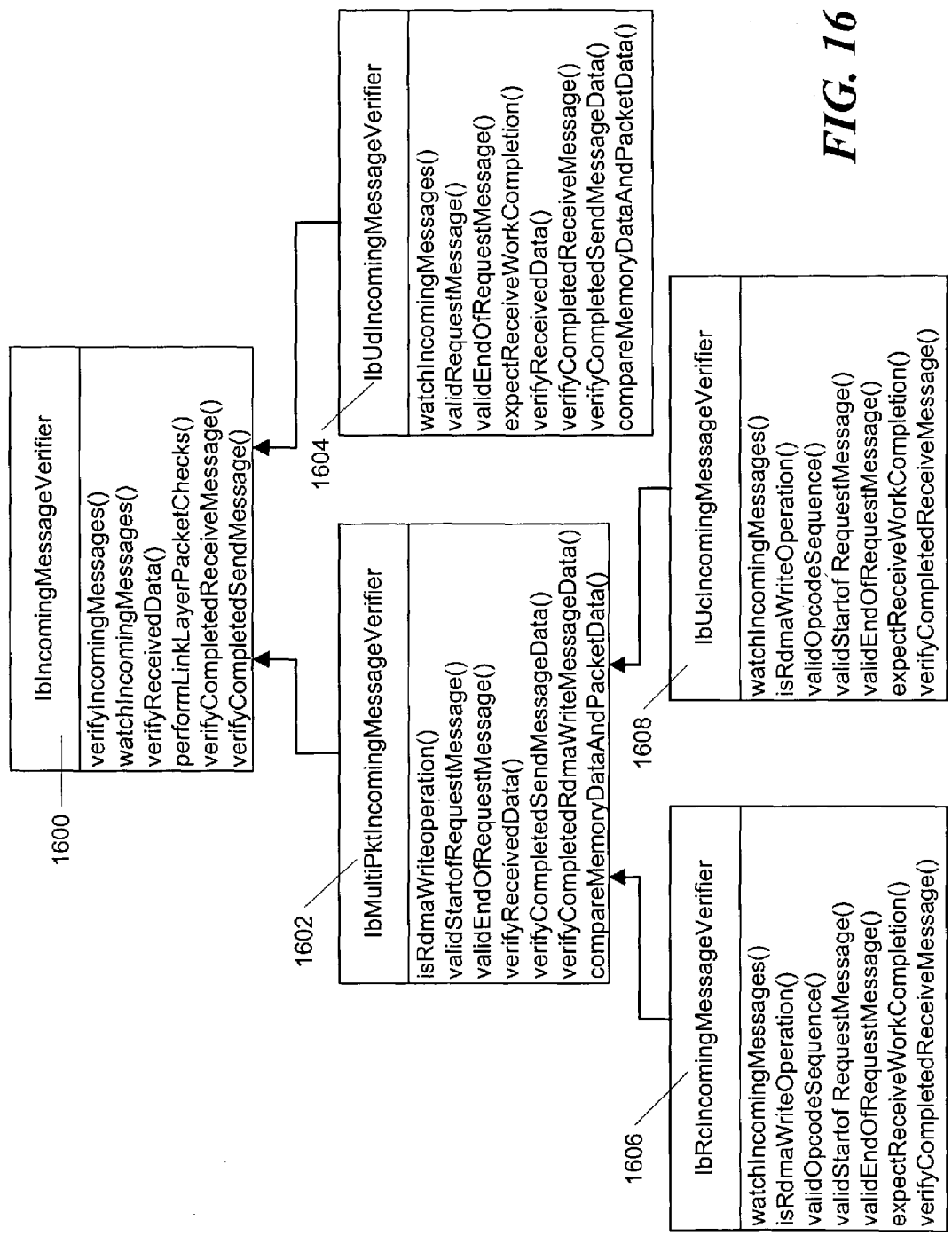
FIG. 16 is a class diagram of the incoming message verifier class and its subclasses.

FIG. 16 shows classes and subclasses used to generate incoming message verifier objects that verify messages received by the channel adapter. The verification of incoming messages is performed in two stages, each of which is controlled by a separate thread. The watchIncomingMessages( ) method starts a monitor thread that monitors incoming activity, validates certain fields of the packets and queues expected receive completions upon receiving all packets of a message. The monitor thread also stores the packet data for later verification. The verifyIncomingMessages( ) method starts a verification thread that waits for receive completions to occur and then verifies the received data in memory against the received packet data saved by the monitor thread. The base incoming message verifier class 1600 contains the verifyIncomingMessages( ) method and an abstract watchIncomingMessages( ) method that is implemented in the subclasses. Additional methods in the base class 1600 allow the corresponding object to verify received data (verifyReceivedData( )), to perform link layer packet checks (performLinkLayerPacketChecks( )) and to verify completed receive and send messages (verifyCompletedReceiveMessage( ) and verifyCompletedSendMessage( )). As with the outgoing message verifier class, the base class 1600 also has a multi-packet incoming message verifier subclass 1602. This subclass contains methods specific to RDMA write operations (isRdmaWriteOperation( ) and verifyCompletedRdmaWriteMessageData( )). There are also two abstract methods that allow the start and end of the request message to be validated (validStartOfRequestMessage( ) and validEndOfRequestMessage( )) and additional methods that allow the received data to be verified (verifyReceivedData( )), the memory and packet data to be compared (compareMemoryDataAndPacketData( )) and the completed send message data to be verified (verifyCompletedSendMessageData( )).

The multi-packet incoming message verifier class 1602 has two subclasses 1606 and 1608 that are specific to the reliable and unreliable connection service types, respectively. These two subclasses contain methods with the same name, but which are implemented specifically for the type of service that the corresponding object is verifying. The methods include watchIncomingMessages( ) that implements the abstract method of the same name in the base class 1600. An isRdmaWriteOperation( ) method checks to see whether or not the operation is an RDMA write operation. Further methods validate the packet opcode sequence (validOpcodeSequence( )), the start and end of request messages (validStartOfRequestMessage( ) and validEndOfRequestMessage( )) and the completed received message (verifyCompletedReceiveMessage( )). A further method, expectReceiveWorkCompletion( ), informs the associated completion agent object that a receive work completion is expected upon receipt of all packets for a message so that the message can be verified.

The incoming message verifier class 1600 also has an unreliable datagram incoming message verifier subclass 1604. This class contains methods that allow the resulting object to watch for incoming messages (watchIncomingMessages( )), validate a request message (validRequestMessage( ), verify the received data (verifyReceivedData( )), verify a completed receive message and verify the data for a complete send operation (verifyCompletedReceiveMessage( ) and verifyCompletedSendMessageData( )). Further methods allow the memory and packet data to be compared (compareMemoryDataAndPacketData( )) and informs the associated completion queue agent object that a receive work completion is expected upon receipt of all packets for a message so that the message can be verified (expectReceiveWorkCompletion.)

FIGS. 17-20 illustrate the initialization of the verification mechanism. The first objects that are created are completion queue objects, because, when a queue pair object is created, a reference to the queue pair number with which the queue pair object is associated is passed to the completion queue object. Thus, the completion queue object must be in existence at this point. Next, a queue pair object is created and it, in turn, creates a service object. The service object then creates an incoming message verifier object and an outgoing message verifier object.

Figure 17:
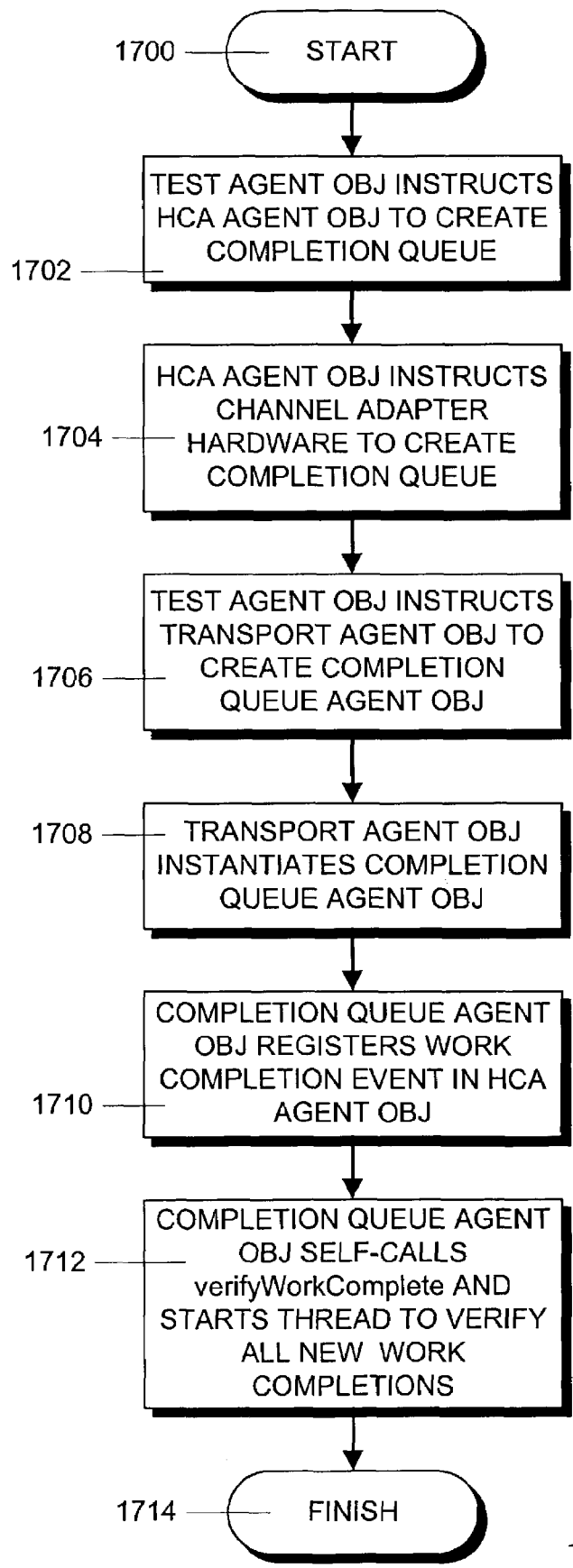
FIG. 17 is a flowchart illustrating the steps in a process in which a completion queue is created and initialized.

FIG. 17 is a flowchart that illustrates the steps in a completion queue initialization process. This process starts in step 1700 and proceeds to step 1702 where a test agent object instructs a channel adapter agent object to create a completion queue. Then, in step 1704, the HCA agent object instructs the channel adapter hardware to create a completion queue. Next, in step 1706, the test agent object instructs the transport agent object to create a completion queue agent verification object. Then, in step 1708, the transport agent object instantiates a completion queue agent verification object. In step 1710, the completion queue agent object registers a work completion event in the channel adapter agent object.

In step 1712, the completion queue verification object self-calls its own verifyWorkComplete( ) method. The method starts a thread to verify all new work completions and the routine finishes in step 1714.

Figure 18:
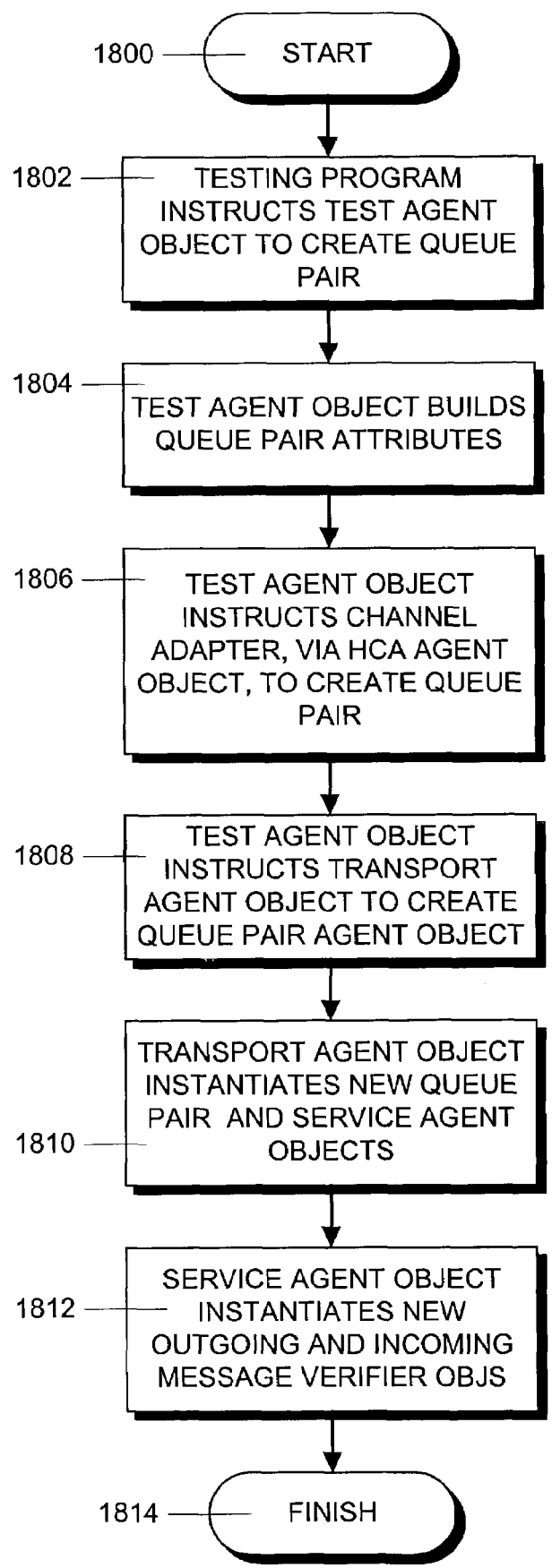
FIG. 18 is a flowchart illustrating the steps in a process in which a queue pair is created and initialized.

FIG. 18 is a flowchart that illustrates the steps in the queue pair initialization process. In general, the initialization process proceeds along two branches. In the first branch, the test agent, or other test controller, instructs a channel adapter, via the HCA agent, to create a queue pair. The second branch involves the test agent instructing the transport agent to create verification objects that verify the actions performed by the channel adapter. These verification objects include a queue pair object, a service object, and the incoming message verifier object and outgoing message verifier objects. FIG. 18 illustrates the steps in these two branches. The illustrative process starts in step 1800 and proceeds to step 1802 where a testing program, or a test bench, instructs a test agent object to create a queue pair in a channel adapter. This step is performed by calling a method in the test agent object, for example, a buildQueuePair( ) method, or other similar method. In response to this call, the test agent object, in step 1804, builds the attributes of the queue pair to be created. Next, in step 1806, the test agent object instructs a channel adapter, via the HCA agent, to create a queue pair with the attributes that have been built. It does this by calling the createQueuePair( ) method of the HCA agent and passing in the queue pair attributes that it has built in response to the original creation request. In response to this instruction, the HCA agent will cause the channel adapter to create the queue pair. This step completes the first branch of the initialization procedure.

In step 1808, the test agent object instructs the transport agent object to create a queue pair verification object. It does this by calling the createQueuePair( ) method of the transport agent object, again passing in the attributes that were created in response to the request from the test system.

In step 1810, in response to the call to the createQueuePair( ) method, the transport agent object creates a new service agent verification object that, in turn, instantiates a new queue pair verification object. Next, in step 1812, the service agent object, instantiated in step 1810, instantiates new incoming and outgoing message verifier objects. The initialization process then ends in step 1814.

Figure 19:
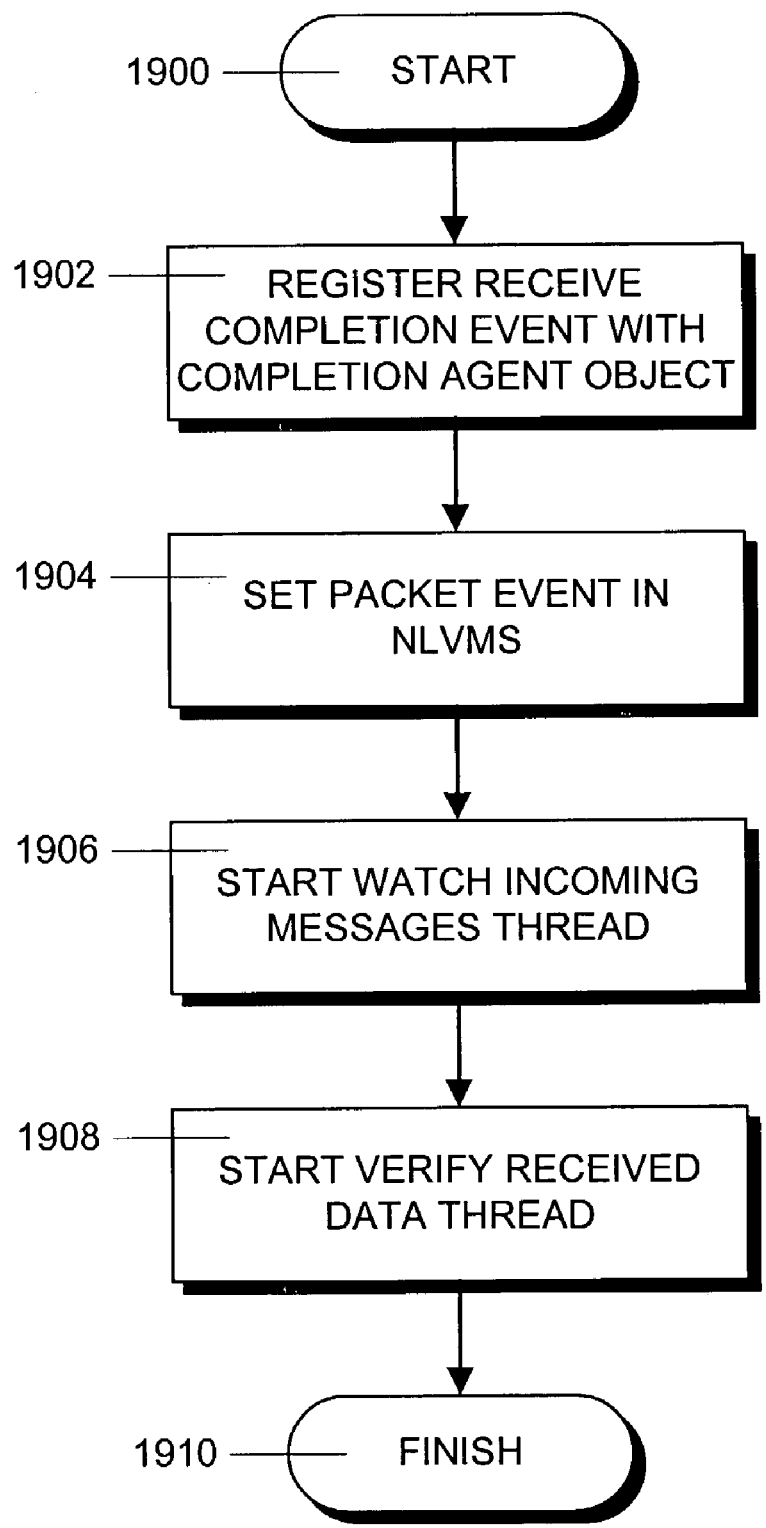
FIG. 19 is a flowchart illustrating the steps in a process for initializing an incoming message verifier object that occurs when the object is instantiated.

The incoming and outgoing message verifier objects verify the incoming messages and outgoing messages, respectively, that are received and sent from the queue pair. An incoming message object and an outgoing message object are instantiated by each service object that is created by a queue pair object. FIG. 19 is a flowchart that illustrates the initialization process that takes place when a UC incoming message verifier object is instantiated. The corresponding processes for RC, RD and UD message types are very similar and, therefore, are not shown for clarity. This process begins in step 1900 and proceeds to step 1902 where the incoming UC message verifier object registers a receive completion event with the completion agent object. It does this by calling the registerReceiveCompletionEvent( ) method of the completion queue agent, passing in the appropriate parameters.

Next, in step 1904, the incoming message verifier object registers an interest in receiving notifications of incoming packets. This interest is registered in an incoming packet event filter in the network verification layer mechanism that is located in the incoming path from the switch fabric. The incoming message verifier object registers this interest by calling a setPacketEvent( ) method in the incoming packet event filter, passing in the appropriate parameters.

In step 1906, the incoming message verifier object then starts a thread to watch incoming messages to the queue pair by calling its own watchIncomingMessage( ) method. Next, in step 1908, the incoming message verifier object starts a thread to verify incoming messages by calling its own verifyReceivedData( ) method. The initialization process then finishes in step 1920. The watch incoming messages thread continuously waits for notifications of an incoming packet event for which an interest was registered in step 1904. When the event is triggered, the watch incoming messages thread stores copies of packets as the packets are received. Once all packets for a message have been received, the thread notifies the verify received data thread that a new message has been received and needs to be verified. The verify received data thread then examines the message and either prints an error or verifies that the message is correct.

Figure 20:
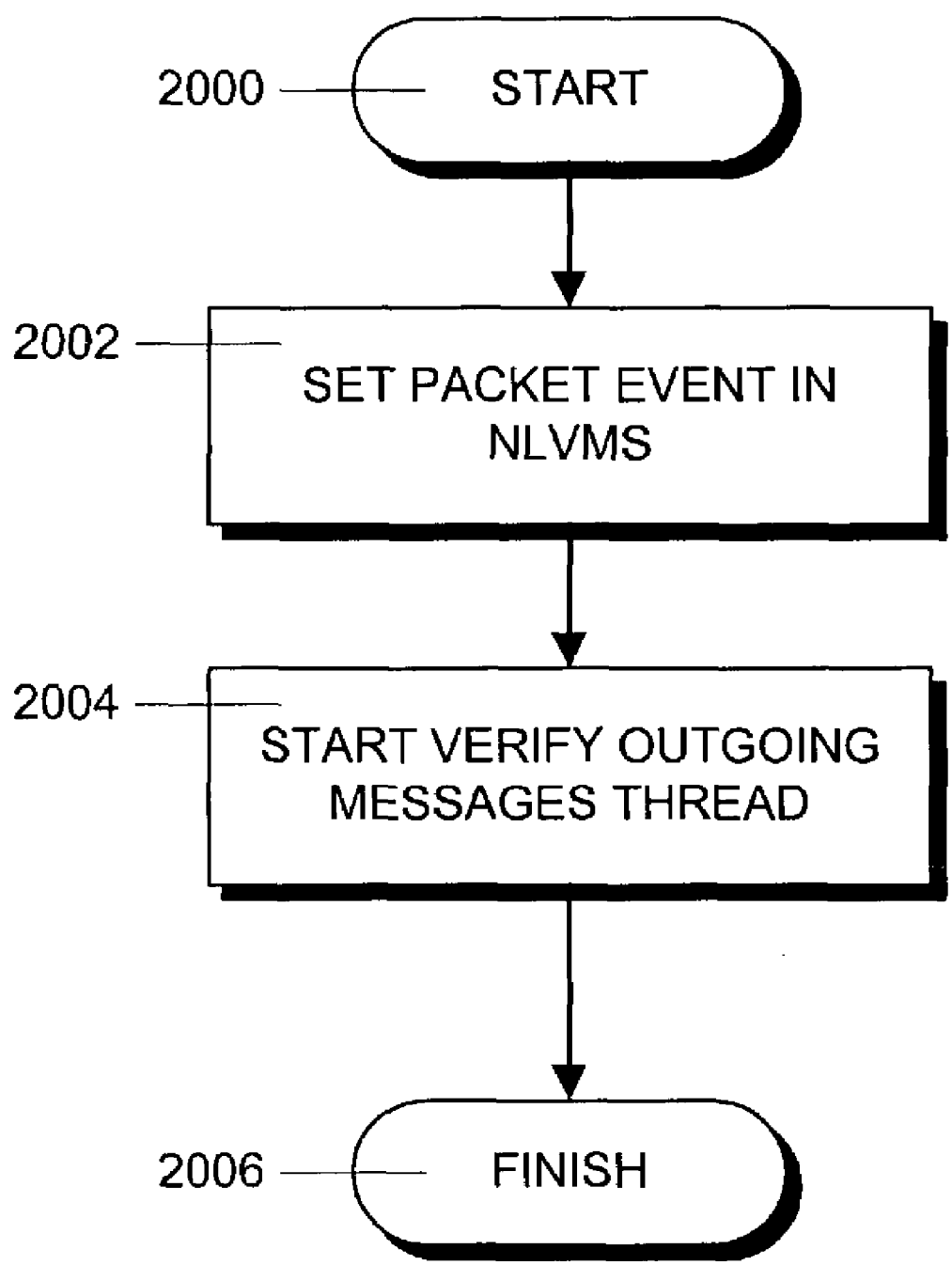
FIG. 20 is a flowchart illustrating the steps in a process for initializing an outgoing message verifier object that occurs when the object is instantiated.

FIG. 20 is a flowchart that illustrates the initialization process that takes place when a UC outgoing message verifier object is instantiated. The corresponding processes for RC, RD and UD message types are very similar and, therefore, are not shown for clarity. This process begins in step 2000 and proceeds to step 2002 where the outgoing UC message verifier object registers an interest in notifications of outgoing packets in an outgoing packet event filter in the network verification layer mechanism in the outgoing path from the switch fabric. The outgoing message verifier object does this by calling a setPacketEvent( ) method in the outgoing packet event filter, passing in the appropriate parameters.

In step 2004, the incoming message verifier object starts a thread to verify outgoing messages by calling its own verifyOutgoingMessages( ) method. This thread continuously waits on the outgoing packet event for which an interest was registered in step 2002. When the event is triggered, the outgoing verifier object verifies the packets as the packets are sent.

Figure 21A:
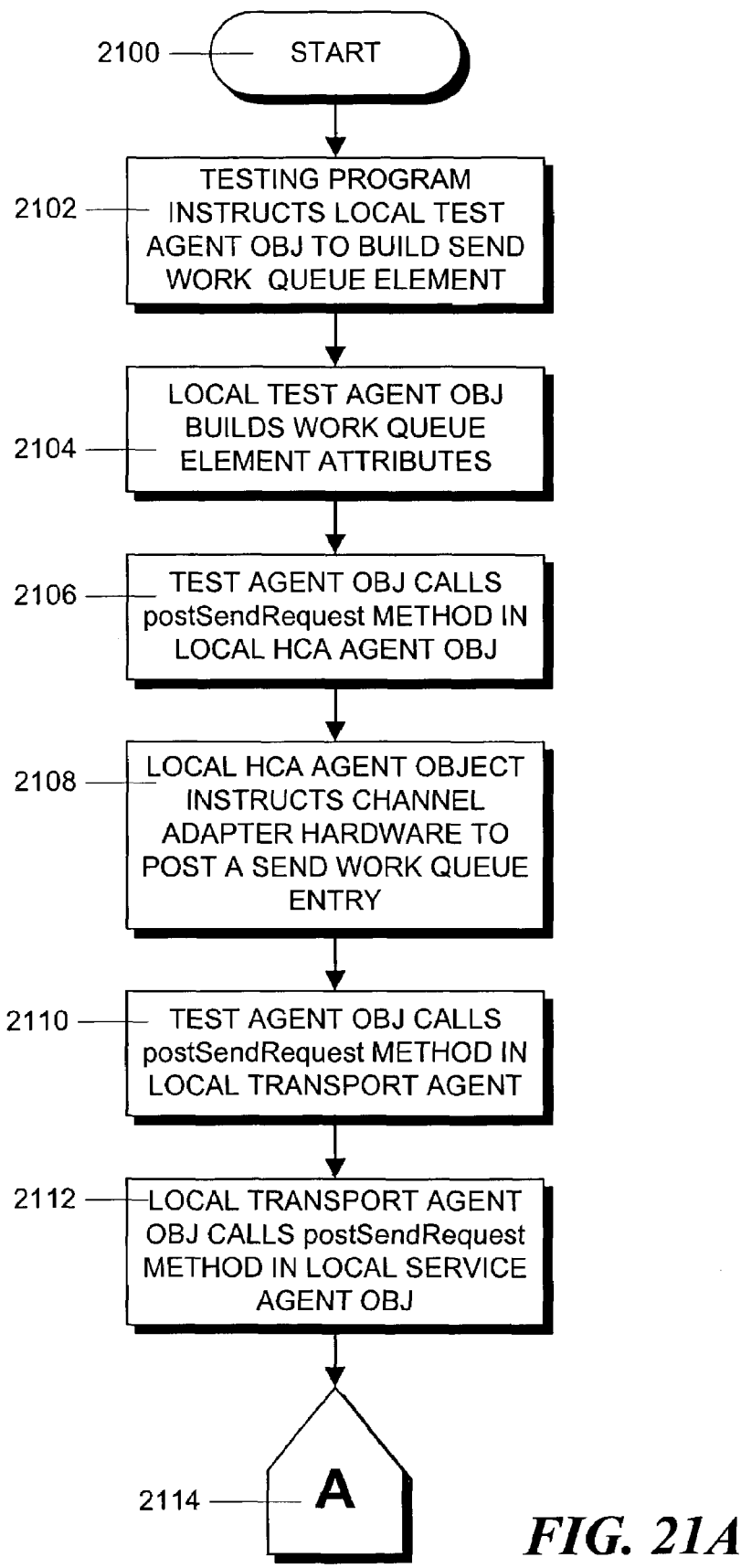
FIGS. 21A and 21B, when placed together, form a flowchart illustrating the steps in a process in which a send work queue element is posted on a local work queue.
Figure 21B:
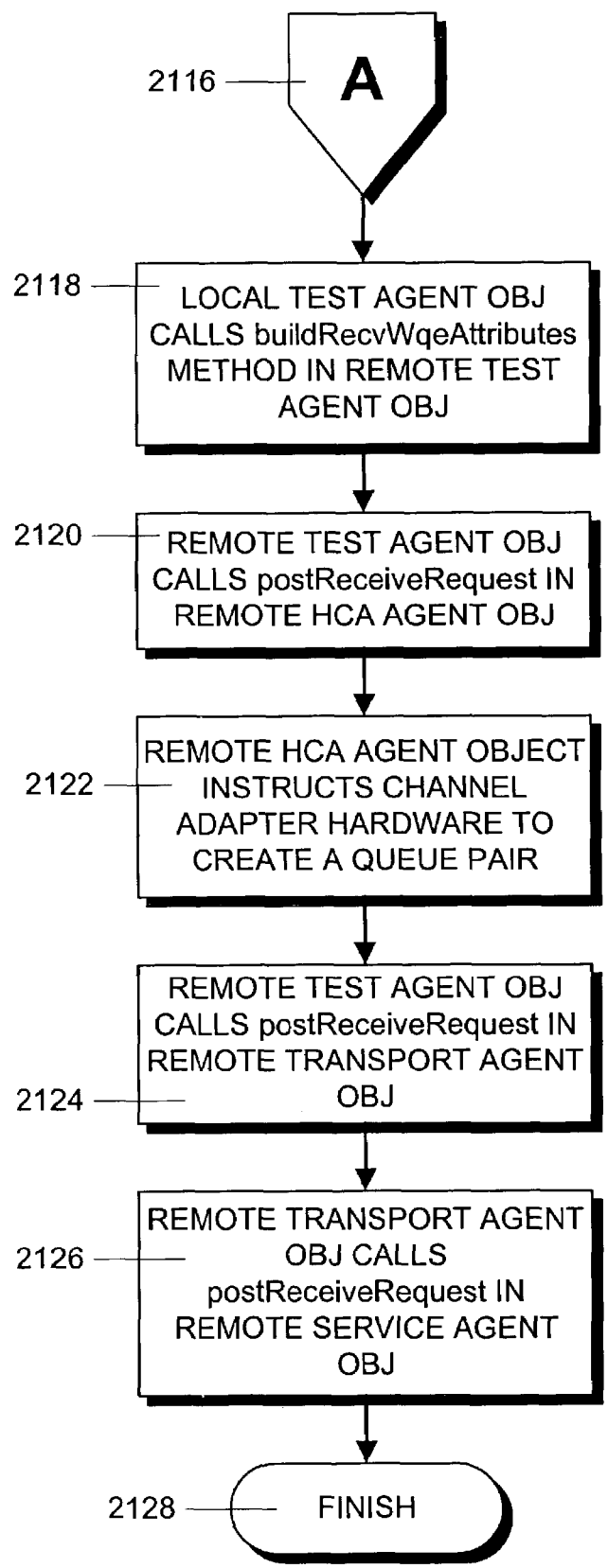
Figure 22:
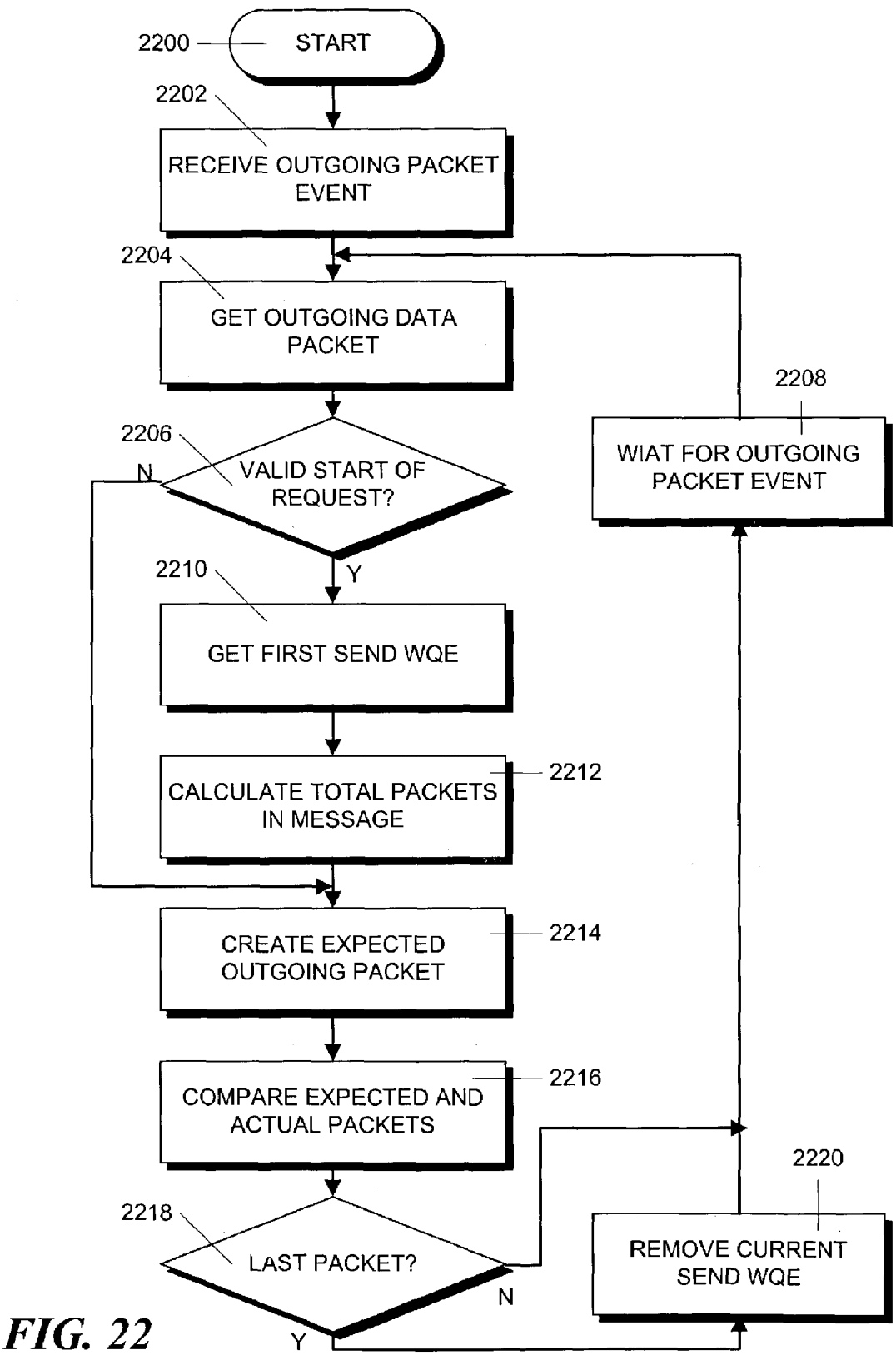
FIG. 22 is a flowchart illustrating the steps in a process for verifying outgoing messages.

FIGS. 21-24 illustrate the actual verification work (generating stimuli and verifying responses that is performed by the system. FIGS. 21A and 21B illustrate posting a local send work queue element that causes the posting of a remote receive work queue element. The posting on the local side results in the sending of an outgoing message. FIG. 22 illustrates verifying such an outgoing message. The outgoing message that is verified on the local side results in an incoming message on the remote side, and FIGS. 23A, B and C and FIGS. 24A, B and C illustrate the verification of such an incoming message.

In particular, FIGS. 21A and 21B, when placed together, form a flowchart that illustrates the steps in a process for posting a send work queue element on a work queue in a local (source) channel adapter and the reception of the corresponding receive request in a remote (destination) channel adapter. This results in the posting of a receive work queue element on the remote work queue.

The local channel adapter would have previously been instructed to create a queue pair as set forth in the example process illustrated in FIG. 18. As with this previous example, the process proceeds in two branches in which the local channel adapter is first instructed to post a send work queue element and the remote channel adapter is instructed to create a queue pair and post a receive work queue element. Then the appropriate incoming and outgoing message verification objects are created in the local and remote verification mechanisms to verify that the posting and reception occurred properly.

This process starts in step 2100 and proceeds to step 2102 where a testing program, or controller, instructs a local test agent object to build a send work queue element. In response, in step 2104, the local test agent builds the work queue element attributes. Then, in step 2106, the local test agent object calls a postSendRequest( ) method in a local HCA agent. In response, in step 2108, the local HCA agent object instructs the local channel adapter hardware to post a send work queue element on the previously created queue pair. Then, in step 2110, the test agent object calls a postSendRequest( ) method in a local transport agent object in the verification mechanism that verifies the operation of the local channel adapter hardware. The local transport agent would have been previously instructed to create verification objects for the creation of a queue pair. These verification objects include a local service agent and its accompanying local queue pair agent. The local transport agent object, in response, in step 2112, calls a postSendRequest( ) method in a local service agent object.

The process then proceeds, via off page connectors 2114 and 2116, to step 2118 where the local test agent object then calls a buildRecvWqeAttributes( ) method, or a similar method, in a remote test agent object. This instruction causes the remote test agent object to call a postReceiveRequest( ) method in a remote HCA agent object as set forth in step 2120.

Next, in step 2122, the remote HCA agent object instructs the remote channel adapter hardware to create a queue pair along the lines of the process set forth in FIG. 18. Then, in step 2124, the remote test agent calls a postReceiveRequest( ) method in a remote transport agent object. Finally, in step 2126, the remote transport agent object calls a postReceiveRequest( ) method in a remote service agent object. The process then finishes in step 2128.

FIG. 22 is a flowchart that shows the steps in an illustrative process for verifying outgoing packets. This process begins in step 2200 and proceeds to step 2202 where the process is initiated when the outgoing message verifier object receives a notification from the NLVM that an outgoing packet event has occurred. The process then proceeds to step 2204 where the outgoing packet data is retrieved from the NLVM. This data is then examined to determine whether it is a valid start of a request. This is performed by the outgoing identifier object by calling its validStartOfRequest( ) method.

If the outgoing packet is a valid start of request, the process proceeds to step 2210 where the first send work queue entry is retrieved and, in step 2212, the total number of packets in the message is calculated from information in the work queue entry. The process then proceeds to step 2214. Alternatively, if the outgoing packet is not a valid start of request the process proceeds directly to step 2214.

Next, in step 2214, an outgoing packet that would be expected from the packet data and information in the work queue entry is created by calling the createOutgoingExpectPacket( ) method of the outgoing verifier object. In step 2216, the expected and actual packets are compared and an error is generated is the packets are not the same.

If the packets are the same, a check is made in step 2218 to determine if the packet being examined is the last packet in the message. If so, the current send work queue entry is removed and the process proceeds to step 2208 to wait to be notified of another outgoing packet event. Alternatively, if in step 2218, a determination is made that the packet is not the last packet in the message the process proceeds directly to step 2208. Operation continues in this manner as the process is notified of additional outgoing packets.

Figure 23A:
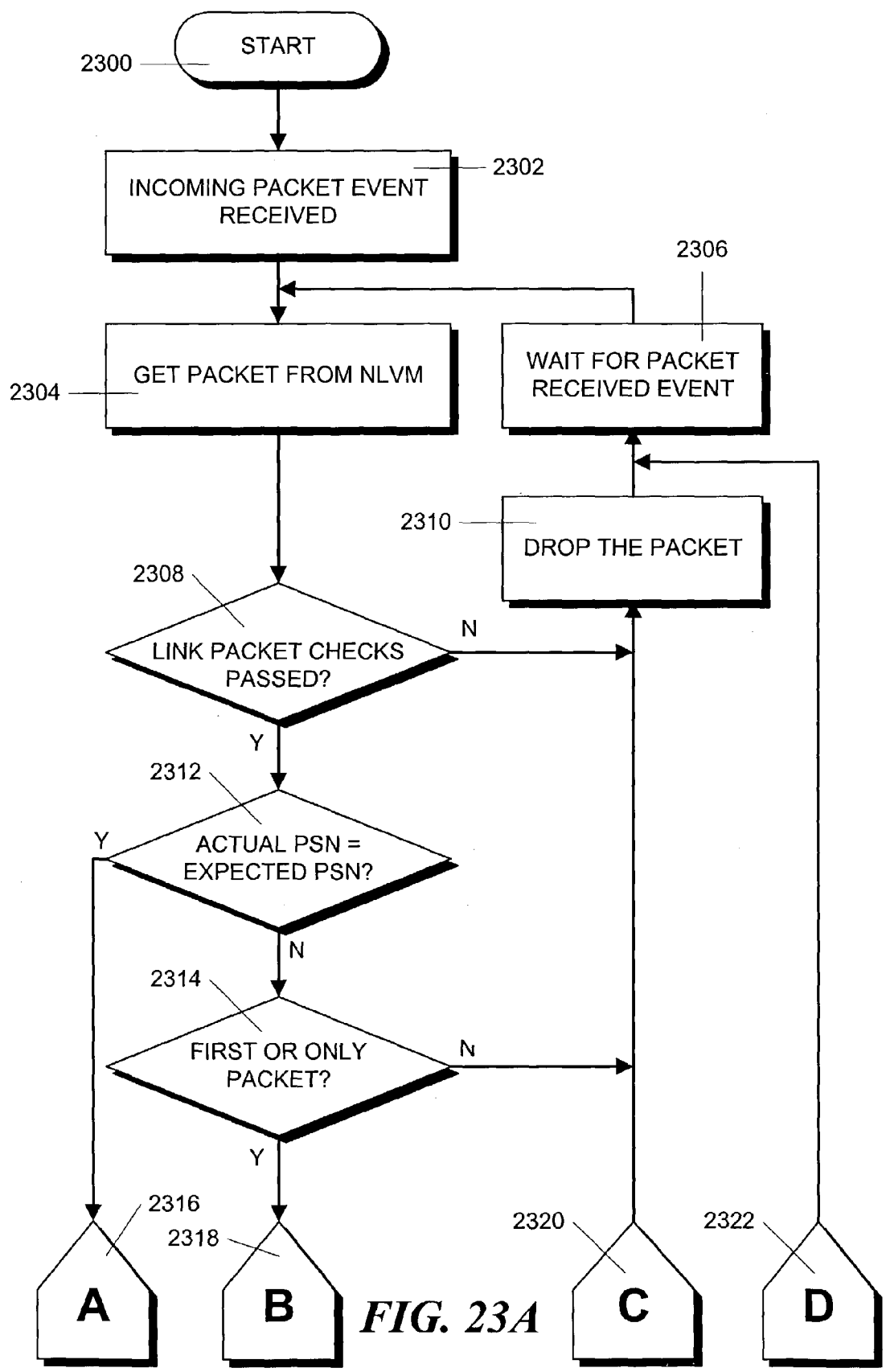
FIGS. 23A-23C, when placed together, form a flowchart illustrating the steps in a process for watching and processing incoming messages.
Figure 23B:
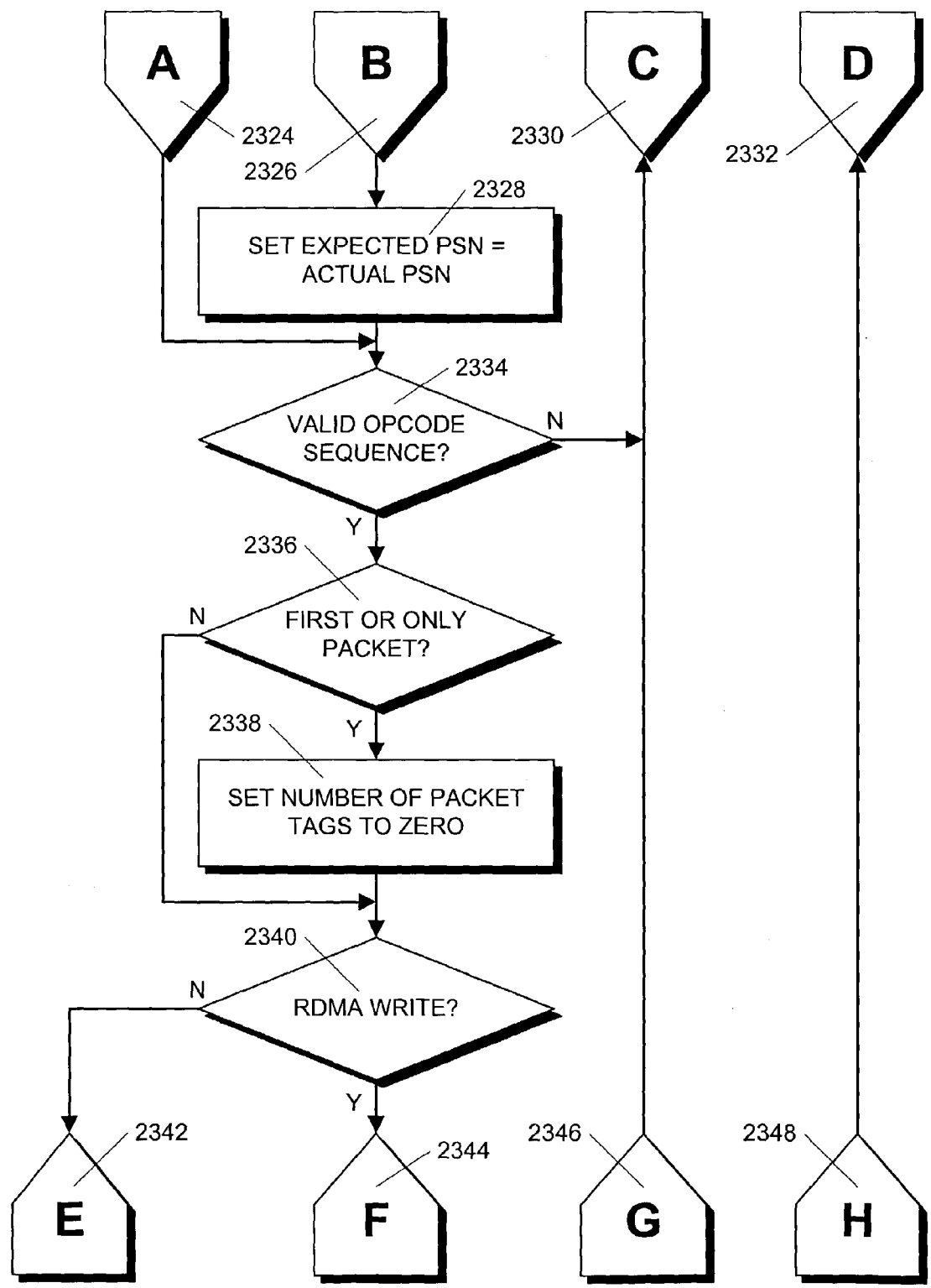
Figure 23C:
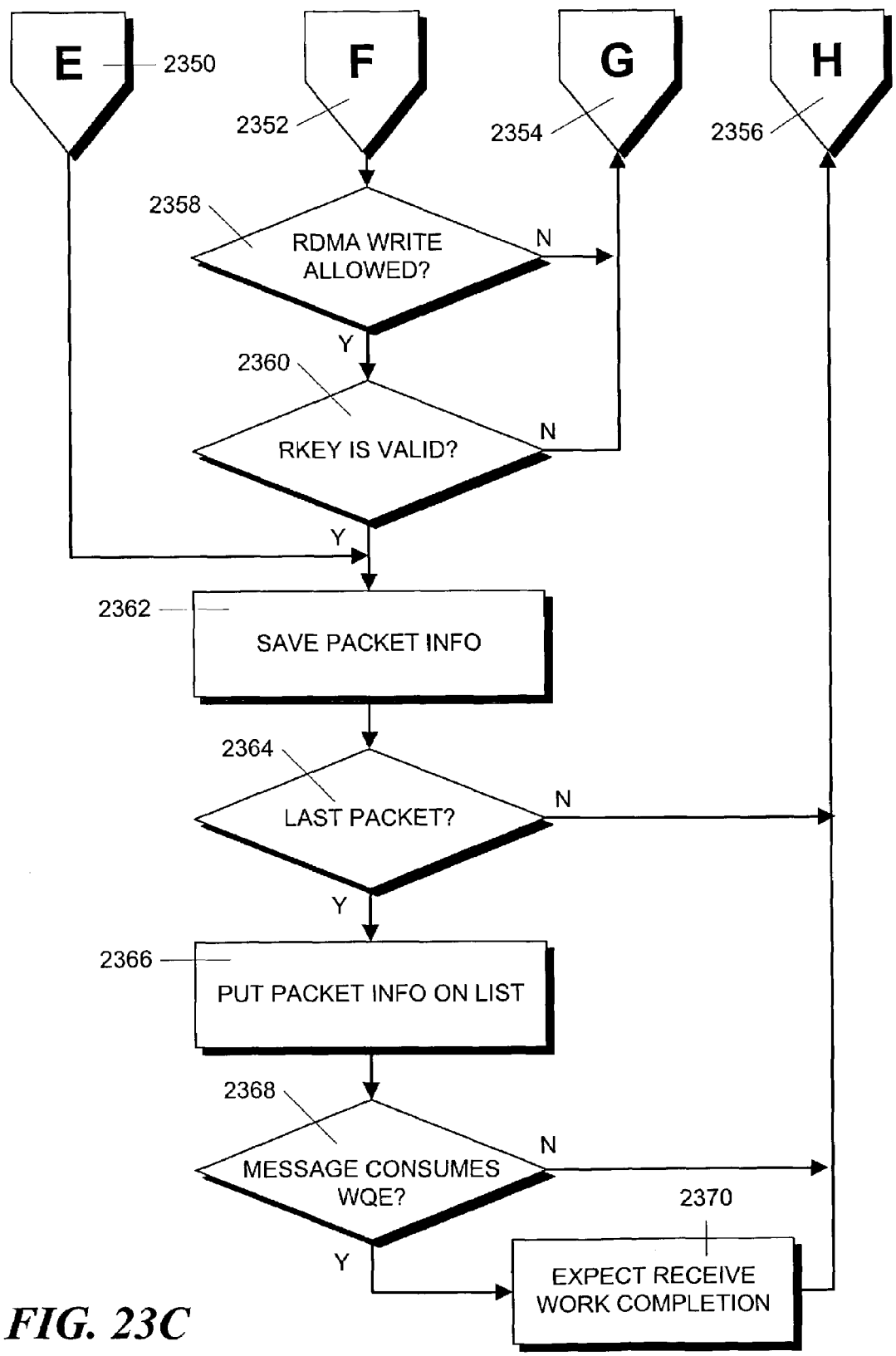

FIGS. 23 and 24 illustrate the verification of an incoming message. This process involves accumulating the packets for a message using a watchIncoming messages thread and then verifying the received data with a verifyReceivedData thread. In particular, FIGS. 23A-23C, when placed together, form a flowchart that illustrates the steps in an illustrative process performed by the watch incoming messages thread. This process begins in step 2300 and proceeds to step 2302 where the process is initiated when an incoming packet event is received from the NLVM. In step 2304, information in the received packet is retrieved from the NLVM and, in step 2308, several checks are performed on the packet information by calling the performLinkLayerPacket Checks( ) method of the incoming message verifier object. If these checks are not passed, then the received packet is dropped in step 2310 and the process proceeds to step 2306 where the process waits for the packet received event to be triggered when another incoming packet is received. When received, that packet is processed in steps 2304 and 2308, as discussed above.

If, in step 2308, the packet checks are passed, then the process proceeds to step 2312 where a check is made to determine whether the packet serial number of the received packet is equal to the packet serial number that was expected, indicating that the packet is part of the message being processed. If a packet with an unexpected serial number is received, then, in step 2314, the a determination is made whether the packet is the first packet in a group of packets for the message being processed or is the only packet that will be received in the message. If additional packets are part of the message, then the received packet is part of another message and the process proceeds to step 2310 where the packet is dropped. The process then waits for another packet in step 2306.

Alternatively, if, in step 2314, a determination is made that the received packet is the first packet of a message or that the received packet is the only packet of a message, then the process proceeds, via off-page connectors 2318 and 2326, to step 2328 where the expected packet serial number is set to the actual packet serial number. The process then proceeds to step 2334. Alternatively, if the actual packet serial number of the received packet was the expected serial number as determined in step 2312, then the process proceeds, via off-page connectors 2316 and 2324, directly to step 2334.

In step 2334, the packet op code sequence is examined by calling the validOpcodeSequence( ) method of the incoming message verifier object. If the op code sequence is not valid, then the process proceeds, via off-page connectors 2330 and 2320 back to step 2310 where the packet is discarded and the process repeated with the next received packet.

If the op code sequence is valid, as determined in step 2334, then a determination is made whether the packet is the first packet in a group of packets for the message being processed or is the only packet that will be received in the message. If so, the process proceeds to step 2338 where the number of packet tags is set to zero. Alternatively, if the received packet is not the first packet in a group of packets or is not the only packet, step 2338 is skipped.

Next, in step 2340, a determination is made whether the operation from which the message was generated is an RDMA write operation by calling the isRdmaWriteOperation( ) method of the incoming message verifier object. If so, the process proceeds, via off-page connectors 2344 and 2352 to step 2358 and 2360 where additional checks are made to determine whether the RDMA write operation is allowed and whether the RKEY used in the operation is valid. If either of these checks is not passed, the process proceeds, via off-page connectors 2354, 2346 and 2330, 2320, back to step 2310 where the packet is dropped and the process repeated for the next received packet.

If the operation is not an RDMA write operation as determined in step 2340, the process proceeds, via off-page connectors 2342 and 2350 to step 2362. The process also arrives at step 2362 if all of the RDMA write checks have been passed. In step 2362, the packet information is saved and a check is made in step 2364 whether the received packet is the last packet of the message. If it is not the last packet, then the process proceeds, via off-page connectors 2356, 2348 and 2332, 2322, back to step 2306 where the process waits for another packet to be received.

If, in step 2364, a determination is made that the received packet is the last packet in the message, then the process proceeds to step 2366 where the packet information is put on a list. Then, in step 2368, a determination is made whether the message consumes the entire work queue entry. If it does, then the thread informs the associated completion queue agent object that a receive work completion event is expected so that the message can be verified. The thread does this by calling the expectReceiveWorkCompletion( ) method of the incoming message verifier object. Alternatively, if, in step 2368, it is determined that the message does not consume the entire work queue entry, then the process proceeds, via off-page connectors 2356, 2348 and 2332, 2322, back to step 2306 where the process waits for another packet to be received. Operation continues in this manner until the entire incoming message has been received.

When the receive work completion event is triggered, the completion queue agent starts verification of the received message by calling the verifyCompletedReceiveMessage( ) method of the incoming message verifier object. This method informs the verify received data thread to verify the newly received message.

Figure 24A:
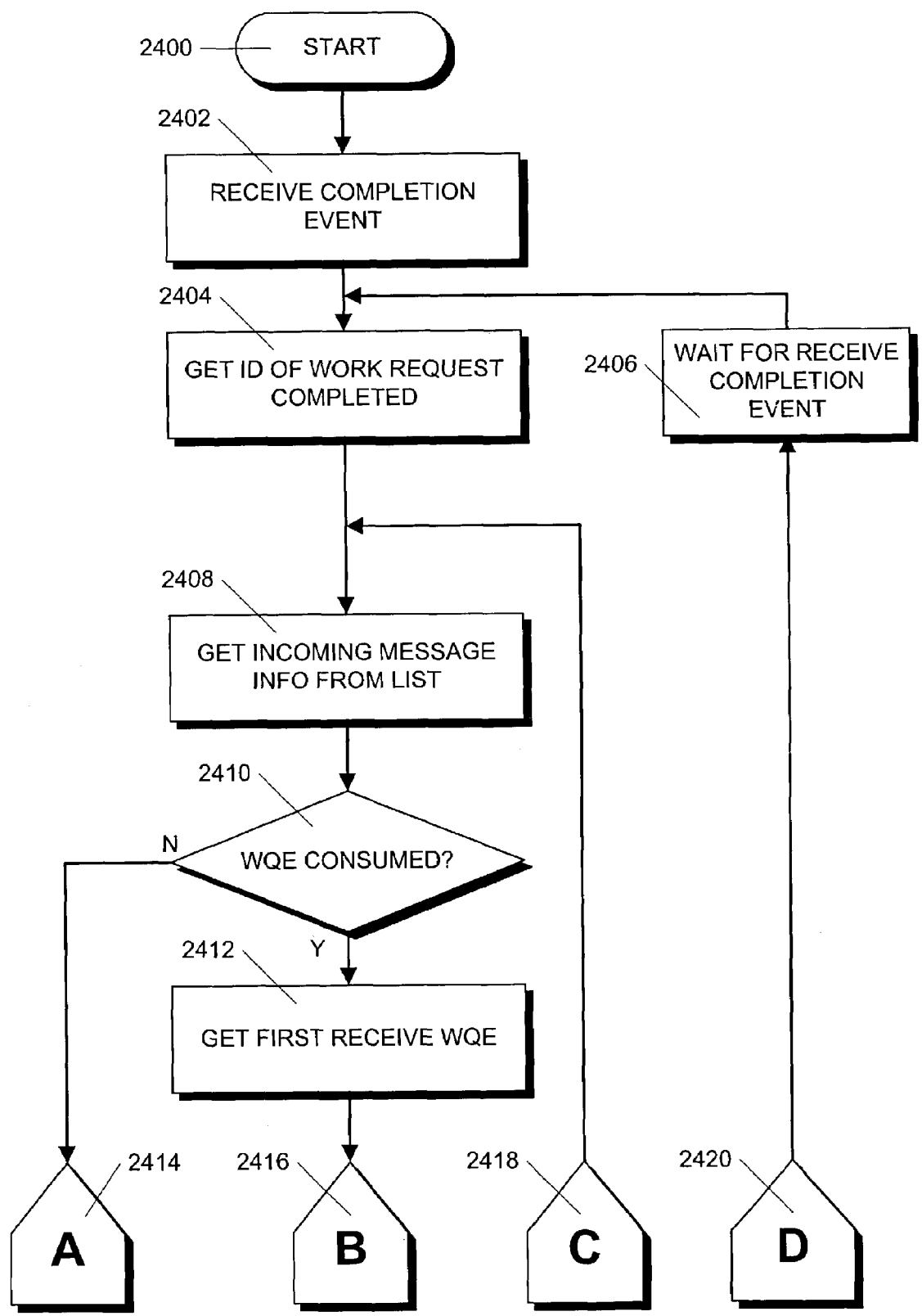
FIGS. 24A and 24B, when placed together, form a flowchart illustrating the steps in a process for validating received data.
Figure 24B:
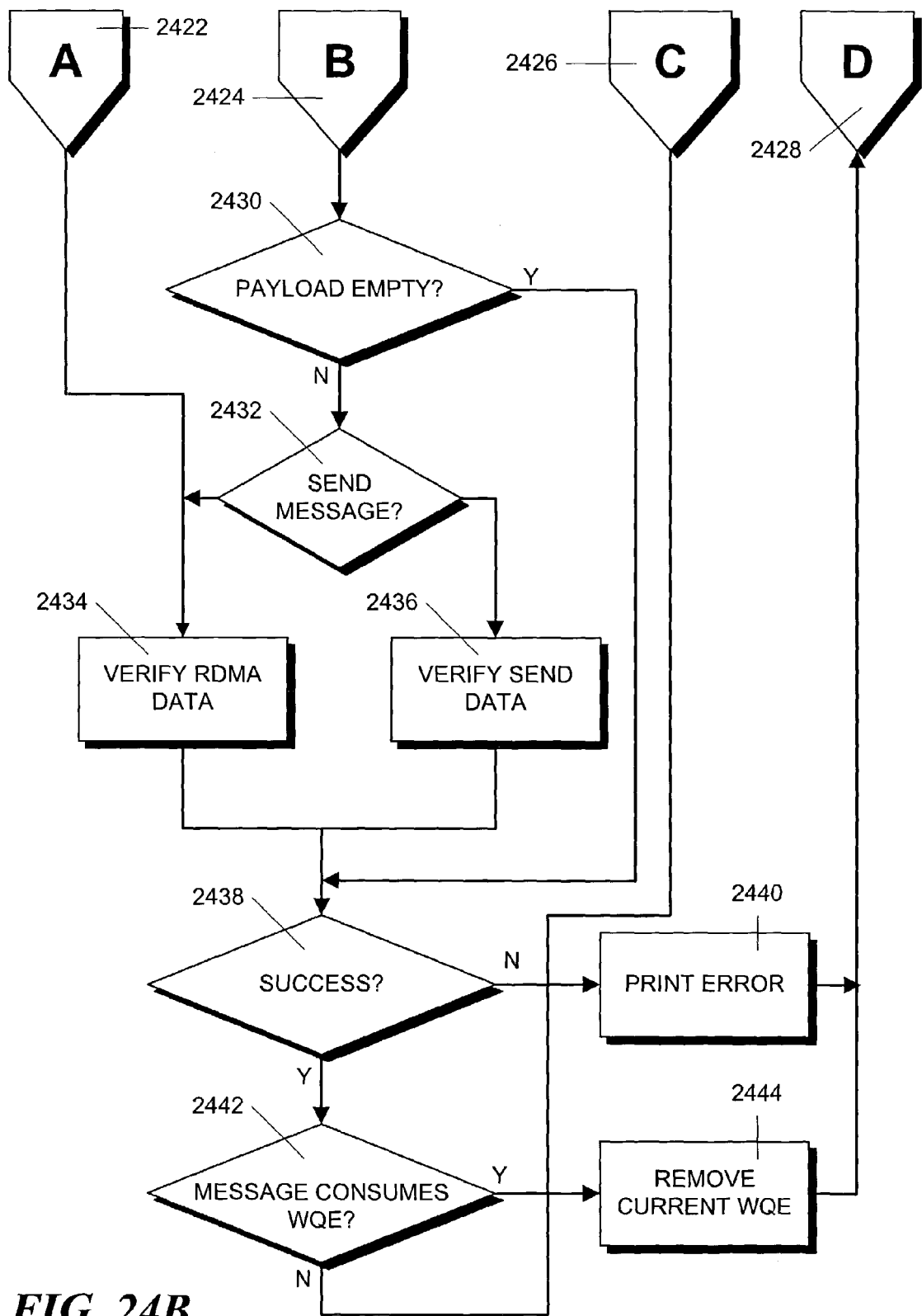

FIGS. 24A and 24B, when placed together, form a flowchart that illustrates the steps in a process for verifying the received data. This process begins in step 2400 and proceeds to step 2402 where the process is started when a receive completion event is triggered. The process then proceeds to step 2404 where the ID of the work request that resulted in the reception of the message is obtained. Then, in step 2408, the ID is used to retrieve the incoming message information from the list on which the information was placed by the incoming message verifier object in step 2366 (FIG. 23C.) Next, in step 2410, a determination is made whether the message consumes the entire work queue entry. If the message does not consume the entire entry, then the operation is an RDMA operation involving multiple messages and the process proceeds, via off-page connectors 2414 and 2422, to step 2434 where the RDMA data of the message is verified. The data is verified by calling the verifyCompletedRdmaWriteMessageData( ) method of the multi-packet incoming message verifier object. The process then proceeds to step 2438, which is discussed below.

Alternatively, if in step 2410, a determination is made that the message consumes the entire work queue entry, then the operation involves a single message and could be either an RDMA operation or a send operation. In order to determine which operation is involved the process proceeds to step 2412 where the first receive work queue entry is retrieved. The process then proceeds, via off-page connectors 2416 and 2424 to step 2430.

In step 2430, a determination is made whether the message payload is empty. If the payload is not empty, then the process proceeds to step 2432 where a determination is made whether the message is a send message or an RDMA message. If the message is a send message, then the send data is verified in step 2436 by calling the verifyCompletedSendMessageData( ) method of the multi-packet incoming message verifier object. Alternatively, if the message is part of an RDMA operation, then the RDMA data is verified by calling the verifyCompletedRdmaWriteMessageData( ) method of the multi-packet incoming message verifier object.

The process then proceeds to step 2438. The process also arrives here if the work queue entry was consumed in step 2410 and if the payload was empty as determined in step 2430. In step 2438, the success of the previously described operations is tested. If these operations were not successful, an error is printed in step 2440 and the process proceeds, via off-page connectors 2428 and 2420, to step 2406 where the process waits for the next receive completion event to occur.

Alternatively, if a determination is made in step 2438 that the operation was successful, then, in step 2442, a determination is made whether the message that was just processed consumes the work queue entry. If it does, then the work queue entry is removed in step 2444 and the process proceeds, via off-page connectors 2428 and 2420, to step 2406 where the process waits for the next receive completion event to occur. Alternatively, if the message does not consume the work queue entry, then the process proceeds, via off-page connectors 2426 and 2418, back to step 2408 where the message information from the next message is retrieved from the message list. This information is then processed as described above. Operation continues in this manner as each receive completion event occurs.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different arrangements can be used for the verification components, including non-object-oriented programs and hardware implementations. Other aspects, such as the specific process flow, as well as other modifications to the inventive concept are intended to be covered by the appended claims

What is claimed is:

1. An apparatus for configuration independent verification of transport and link layers of a channel adapter in an InfiniBand$^{SM}$ system under commands generated by a test agent component, the channel adapter having a plurality of internal components that use the transport and link layers to transfer data packets to the InfiniBand$^{SM}$ system, the apparatus comprising:

means, including a hardware independent interface, that is responsive to test agent component commands for creating and controlling the plurality of channel adapter internal components;

means responsive to test agent component commands for creating a plurality of verification software entities that represent each of the plurality of channel adapter internal components; and means controlled by the plurality of verification software entities for monitoring and verifying communications sent and received by the plurality of channel adapter internal components.

2. The apparatus of claim 1 wherein the plurality of verification software entities comprises a queue pair verification software entity that represents a queue pair in the channel adapter.

3. The apparatus of claim 2 wherein the queue pair verification software entity comprises means for creating verification objects that verify incoming messages and outgoing messages from and to a queue pair represented by the queue pair verification software entity.

4. The apparatus of claim 3 wherein the verification objects create threads that verify the data in incoming and outgoing messages from and to a queue pair represented by the queue pair verification software entity.

5. A method for configuration independent verification of transport and link layers of a channel adapter in an InfiniBand$^{SM}$ system under commands generated by a test agent component, the channel adapter having a plurality of internal components that use the transport and link layers to transfer data packets to the InfiniBand$^{SM}$ system, the method comprising:
  (a) creating and controlling the plurality of channel adapter internal components with a hardware independent interface in response to test agent component commands;
  (b) creating a plurality of verification software entities that represent each of the plurality of channel adapter internal components in response to test agent component commands; and
  (c) monitoring and verifying communications sent and received by the plurality of channel adapter internal components under control by the plurality of verification software entities.

6. The method of claim 5 wherein step (b) comprises:
  (b1) creating a queue pair verification software entity that represents a queue pair in the channel adapter.

7. The method of claim 6 wherein step (b1) comprises:
  (b1 a) creating verification objects that verify incoming messages and outgoing messages from and to a queue pair represented by the queue pair verification software entity.

8. The method of claim 7 wherein step (b1 a) comprises creating threads that verify the data in incoming and outgoing messages from and to a queue pair represented by the queue pair verification software entity.

9. An apparatus having at least one processor for configuration independent verification of transport and link layers of a channel adapter in an InfiniBand$^{SM}$ system under control of a test agent component, the channel adapter having a plurality of internal components that use the transport and link layers to transfer data packets to the InfiniBand$^{SM}$ system, the apparatus comprising:
  a channel adapter agent component that controls and configures the channel adapter, the channel adapter agent component having a hardware independent interface with a plurality of methods for creating and controlling the plurality of channel adapter internal components;
  a transport agent component that can create a plurality of verification components for verifying the correct operation of each of the channel adapter internal components; and
  an API interface including a plurality of methods that control the transport agent component to create selected ones of the plurality of verification components.

10. The apparatus of claim 9 wherein the test agent component calls the methods in the channel adapter agent component interface and the API interface of the transport agent component to conduct verification tests of the transport and link layers.

11. The apparatus of claim 9 wherein the verification components include a service agent component, a completion queue component and a fabric agent component.

12. The apparatus of claim 11 wherein the service agent component comprises a mechanism for creating a queue pair component, a send queue component and a receive queue component.

13. The apparatus of claim 12 wherein the queue pair component creates an incoming message verifier object and an outgoing message verifier object.

14. The apparatus of claim 13 wherein the incoming message verifier object starts a thread that verifies each message received by the queue pair represented by the queue pair component.

15. The apparatus of claim 13 wherein the outgoing message verifier object starts a thread that verifies each message send by the queue pair represented by the queue pair component.

16. The apparatus of claim 11 wherein the fabric agent component comprises a mechanism that can control data packets passing between the channel adapter and the InfiniBand$^{SM}$ system.

17. The apparatus of claim 9 wherein the transport agent component comprises a mechanism for destroying verification components after a test has been completed.

18. The apparatus of claim 9 wherein the verification apparatus is implemented by an object-oriented program and each component is implemented by a separate object.

19. The apparatus of claim 15 wherein the transport agent component is an object and the transport agent object instantiates a plurality of verification objects for verifying the correct operation of each of the channel adapter internal components.

20. A method for configuration independent verification of transport and link layers of a channel adapter in an InfiniBand$^{SM}$ system under control of a test agent component, the channel adapter having a plurality of internal components that use the transport and link layers to transfer data packets to the InfiniBand$^{SM}$ system, the method comprising:
  (a) creating and controlling the plurality of channel adapter internal components with a channel adapter agent component having a hardware independent interface with a plurality of methods;
  (b) using a transport agent component to create a plurality of verification components for verifying the correct operation of each of the channel adapter internal components; and
  (c) providing an API interface including a plurality of methods that control the transport agent component to create selected ones of the plurality of verification components.

21. The method of claim 20 further comprising:
  (d) using the test agent component to call the methods in the channel adapter agent component interface and the API interface of the transport agent component to conduct verification tests of the transport and link layers.

22. The method of claim 20 wherein step (b) comprises creating a service agent component, a completion queue component and a fabric agent component.

23. The method of claim 22 wherein step (b) further comprises using the service agent component to create a queue pair component, a send queue component and a receive queue component.

24. The method of claim 23 wherein step (b) further comprises using the queue pair component to create an incoming message verifier object and an outgoing message verifier object.

25. The method of claim 24 wherein step (b) further comprises using the incoming message verifier object to start a thread that verifies each message received by the queue pair represented by the queue pair component.

26. The method of claim 24 wherein step (b) further comprises using the outgoing message verifier object to start a thread that verifies each message send by the queue pair represented by the queue pair component.

27. The method of claim 22 wherein step (b) further comprises using the fabric agent component to control data packets passing between the channel adapter and the Infini-Band$^{SM}$ system.

28. The method of claim 20 wherein step (b) further comprises destroying verification components after a test has been completed.

29. The method of claim 20 wherein the transport agent component is implemented by an object-oriented program and each component is implemented by a separate object.

30. The method of claim 20 wherein the transport agent component is an object and the transport agent object instantiates a plurality of verification objects for verifying the correct operation of each of the channel adapter internal components.

* * * * *